(12) United States Patent
Park et al.

(10) Patent No.: US 12,155,228 B2
(45) Date of Patent: Nov. 26, 2024

(54) WIRELESS POWER TRANSMISSION DEVICE

(71) Applicants: LG ELECTRONICS INC., Seoul (KR); KOREA ADVANCED INSTITUTE OF SCIENCE AND TECHNOLOGY, Daejeon (KR)

(72) Inventors: Jungkeun Park, Seoul (KR); Gu Ho Jung, Sejong-si (KR); Chung Hee Lee, Sejong-si (KR); Ju Yong Lee, Daejeon (KR); Dong Ho Cho, Seoul (KR); Dang-Oh Kim, Sejong-si (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 18/020,591

(22) PCT Filed: Aug. 10, 2020

(86) PCT No.: PCT/KR2020/010574
§ 371 (c)(1),
(2) Date: Feb. 9, 2023

(87) PCT Pub. No.: WO2022/034936
PCT Pub. Date: Feb. 17, 2022

(65) Prior Publication Data
US 2023/0299616 A1    Sep. 21, 2023

(51) Int. Cl.
*H02J 50/12* (2016.01)
*H02J 50/40* (2016.01)
*H02J 50/90* (2016.01)

(52) U.S. Cl.
CPC ............ *H02J 50/12* (2016.02); *H02J 50/402* (2020.01); *H02J 50/90* (2016.02)

(58) Field of Classification Search
CPC ..................................................... H02J 50/402
See application file for complete search history.

(56) References Cited

U.S. PATENT DOCUMENTS

| | | | |
|---|---|---|---|
| 9,577,466 B2 * | 2/2017 | Ku .......................... | H02J 50/90 |
| 10,050,470 B1 * | 8/2018 | Leabman ................. | H02J 50/80 |
| 2015/0115729 A1 * | 4/2015 | Kanno ..................... | H02J 50/23 |
| | | | 307/104 |
| 2018/0219421 A1 * | 8/2018 | Yang ........................ | H02J 50/12 |
| 2018/0262050 A1 | 9/2018 | Yankowitz | |
| 2018/0294677 A1 * | 10/2018 | Yankowitz ............ | H02J 7/0042 |

FOREIGN PATENT DOCUMENTS

| | | |
|---|---|---|
| KR | 10-2014-0007624 A | 1/2014 |
| KR | 10-1715269 B1 | 3/2017 |
| KR | 10-2017-0072761 A | 6/2017 |
| KR | 10-2017-0139220 A | 12/2017 |
| WO | WO 2017/044973 A1 | 3/2017 |

* cited by examiner

*Primary Examiner* — Daniel Kessie
(74) *Attorney, Agent, or Firm* — Birch, Stewart, Kolasch & Birch, LLP

(57) ABSTRACT

A wireless power transmission device can include a plurality of transmission coil units, in which each of the plurality of transmission coil units includes a plurality of antenna coils arranged on different three-dimensional planes, and the plurality of antenna coils are configured to generate a magnetic field passing through at least one or more of the different three-dimensional planes to transfer transmission power to a wireless power reception device.

16 Claims, 29 Drawing Sheets

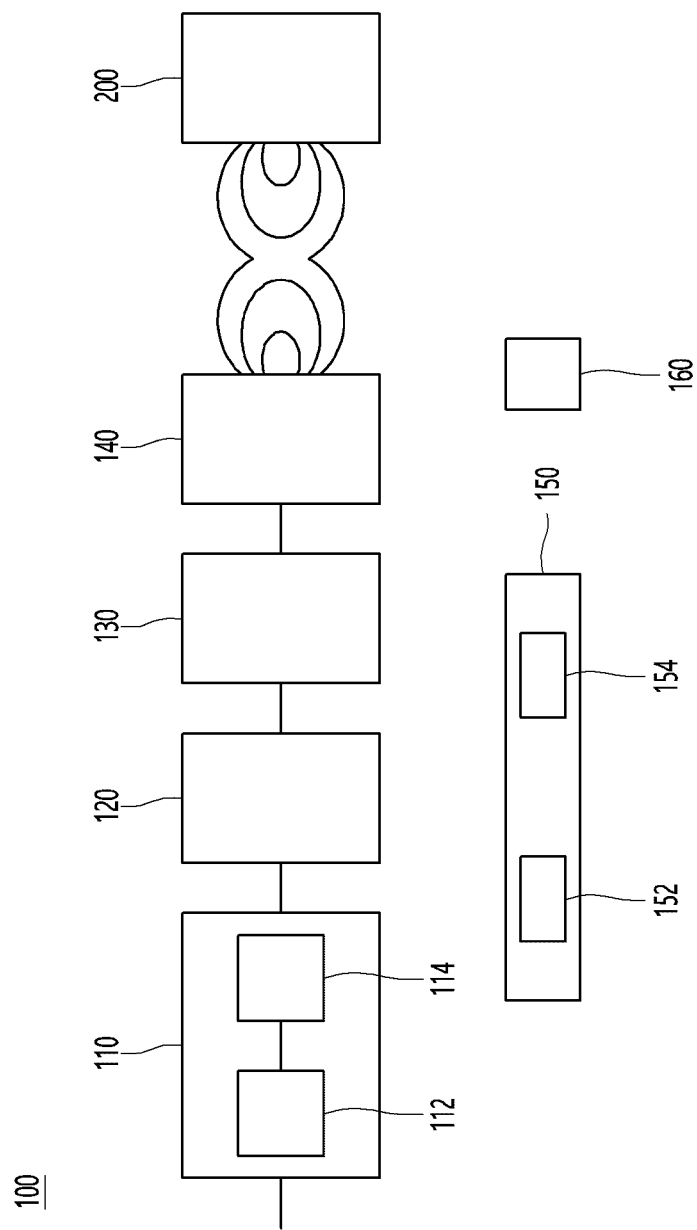

WIRELESS POWER TRANSMISSION DEVICE

CROSS REFERENCE TO RELATED APPLICATIONS

This application is the National Stage filing under 35 U.S.C. 371 of International Application No. PCT/KR2020/010574, filed on Aug. 10, 2020, the entire contents of which are hereby expressly incorporated by reference into the present application.

BACKGROUND

Technical Field

Embodiments relate to a wireless power transmission device.

Background Art

Recently, a wireless power transmission technology capable of wirelessly transmitting power has attracted attention.

Wireless power transmission or wireless energy transfer technology is a technology for wirelessly transmitting electrical energy from a transmitter to a receiver using the principle of induction of a magnetic field.

The wireless power transmission technology can be used in various industries such as IT, railways, automobiles, display devices such as TVs, and home appliances as well as mobile.

Research on the arrangement of a transmission coil unit for quickly charging of transmission power in a wireless power reception device is being actively conducted.

As shown in FIG. 1, a conventional wireless power transmission device 10 includes a plurality of transmission coils 12 arranged in a matrix.

When the wireless power reception device 20 is disposed on a plurality of transmission coils 12, transmission power is transmitted to the wireless power reception device 20 through the transmission coil 12 adjacent to the wireless power reception device 20 to charge the wireless power reception device 20. Reference numeral 22 denotes a reception coil.

As shown in FIG. 2, when the plane of the reception coil 22 of the wireless power reception device 20 faces the plane of the third transmission coil 12c among the plurality of transmission coils 12a to 12d, a magnetic field generated by the transmission coil 12c is subjected to flux linkage with the reception coil 22 to induce a current in the reception coil 22 and convert the current into a voltage to obtain reception power.

However, as shown in FIG. 3, when the plane of the reception coil 22 of the wireless power reception device 20 is perpendicular to the plane of the third transmission coil 12c, the reception coil 22 is not subjected to flux linkage due to the magnetic field generated by the third reception coil 12c to induce no current in the reception coil 22 and thus obtain no reception power. In other words, as shown in FIG. 3, when the wireless power reception device 20 is disposed, the wireless power reception device 20 is not charged or is charged with a small amount of power, thus the power transfer efficiency being not very good.

SUMMARY OF THE DISCLOSURE

Technical Problem

An object of embodiments is to solve the foregoing and other problems.

Another object of the embodiments is to provide a wireless power transmission device capable of always securing maximum power transfer efficiency regardless of the arrangement position or direction of the wireless power reception device.

Still another object of the embodiments is to provide a wireless power transmission device capable of always securing maximum power transfer efficiency in spite of free movement of the wireless power reception device.

Still another object of the embodiments is to provide a wireless power transmission device capable of improving charging efficiency of the wireless power reception device regardless of the arrangement position or direction of the wireless power reception device.

Technical Solution

According to one aspect of embodiments to achieve the above or other objects, a wireless power transmission device includes a plurality of transmission coil units, wherein each of the plurality of transmission coil units includes a plurality of antennas having three-dimensional planes of a stereo-structure, and the plurality of antennas are configured to generate a magnetic field passing through at least one or more of the multi-dimensional planes to transfer transmission power to a wireless power reception device.

Advantageous Effects

Effects of the wireless power transmission device according to the embodiment are described as follows.

According to at least of the embodiments, even when the reception coil of the wireless power reception device is disposed inclined with respect to the horizontal plane, the total sum of the magnetic fluxes respectively generated by the plurality of antennas of each of the plurality of transmission coil units of the wireless power reception device and passing through the reception coil is constant, securing the same power transfer efficiency or the same charging efficiency, regardless of the arrangement position or direction of the wireless power reception device.

According to at least one of the embodiments, even when the arrangement position or direction of the wireless power reception device is changed and the plane of the reception coil of the wireless power reception device is not disposed parallel to the horizontal plane, the same power transfer efficiency is ensured to prevent a defect in which charging efficiency is reduced due to a significant decrease in power transfer efficiency as the arrangement position or arrangement direction of the wireless power reception device is changed.

According to at least one of the embodiments, it is possible to secure constant power transfer efficiency although the wireless power reception device is variously changed in position and direction by including a plurality of transmission coil units each including a plurality of antennas having a multi-dimensional planes disposed between 0 degrees and 359 degrees with respect to multiple axes, thus further expanding the degree of freedom of the direction or position of the wireless power reception device.

A further scope of applicability of the embodiments will become apparent from the following detailed description. However, since various changes and modifications within the spirit and scope of the embodiments can be clearly understood by those skilled in the art, it should be understood that the detailed description and specific embodiments, such as preferred embodiments, are given by way of example only.

BRIEF DESCRIPTION OF THE DRAWINGS

The above and other aspects, features, and advantages of the present disclosure will become apparent from the detailed description of the following aspects in conjunction with the accompanying drawings, described below.

FIGS. 6a and 6b are block diagrams illustrating a wireless power transmission device as one of wireless power transfer systems.

DETAILED DESCRIPTION OF THE EMBODIMENTS

Figure 1:
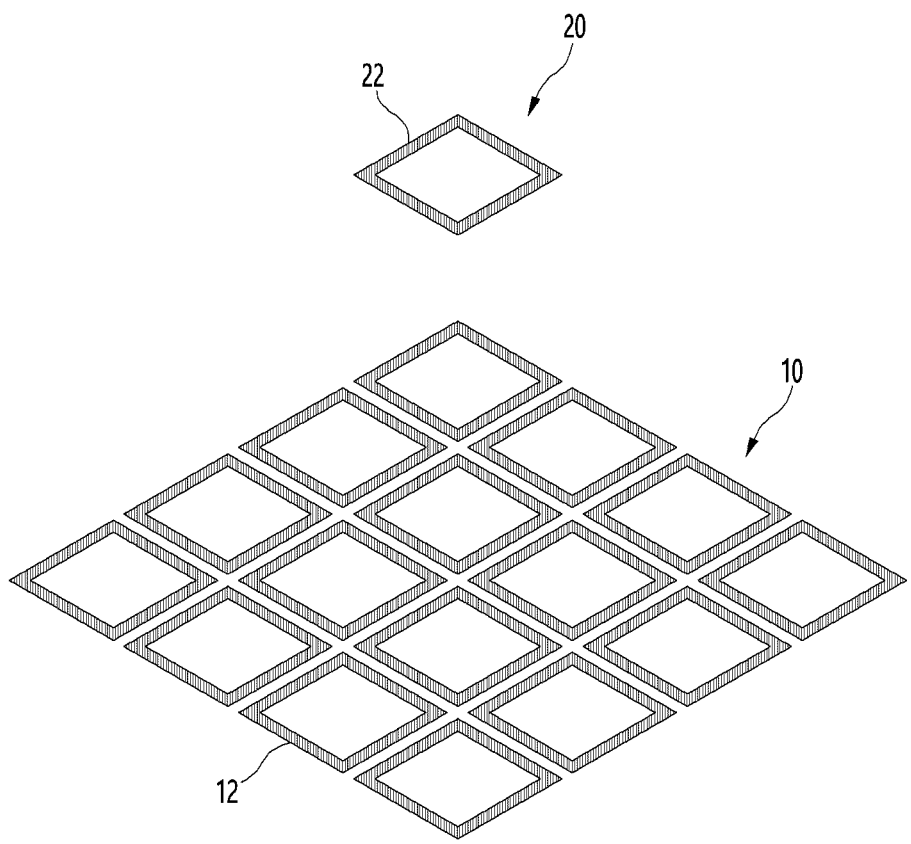
FIG. 1 shows a wireless power transmission device according to the prior art.

Hereinafter, preferable embodiments of the inventive concept will be described in detail with reference to the accompanying drawings. However, the technical idea of the present disclosure is not limited to embodiments to be described and may be implemented in a variety of different forms, and one or more of the components of the embodiments may be used by selectively combining and substituting the components within the range of the technical idea of the present disclosure. Unless defined otherwise, all the terms (including technical and scientific terms) used herein have the same meaning as commonly understood by one of ordinary skill in the art to which the present invention belongs. It will be further understood that the terms, such as those defined in commonly used dictionaries, should be interpreted as having meanings that are consistent with their meanings in the context of the relevant art. The terminology used in embodiments of the present disclosure is for the purpose of describing particular embodiments only and is not intended to be limiting of the inventive concept. In this specification, the singular may also include the plural unless the context clearly indicates otherwise, and "at least one (or more than one) of A, B and C" used herein may include one or more of all possible combinations of A, B, and C. In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. It will be understood that when one element is referred to as being "connected to", "coupled to", or "access" another element, one element may be "connected to", "coupled to", or "access" another element via a further element although one element may be directly connected to or directly access another element. In addition, it will be understood that, when each component is referred to as being formed or disposed "on (above)" or "under (below)" the other component, it can be directly "on" or "under" the other component or be indirectly formed with one or more intervening components therebetween. In addition, it will also be understood that, when each component is referred to as being formed or disposed "on (above)" or "under (below)" the other component, it may mean an upward direction and a downward direction of the component.

Hereinafter, a wireless power transfer system including a wireless power transmission device having a function of wirelessly transferring power according to an embodiment of the present disclosure and an electronic device wirelessly receiving power will be described in detail with reference to the drawings. For example, the electronic device may include a wireless power reception device that wirelessly receives power, but is not limited thereto. The embodiments to be described below are provided as examples to sufficiently convey the spirit of the present disclosure to those skilled in the art. Accordingly, the present disclosure may be embodied in other forms without being limited to the embodiments described below. And, in the drawings, the size and thickness of the device may be exaggerated for convenience. Like reference numbers indicate like elements throughout the specification.

A wireless power transmission device according to an embodiment may be configured in a pad type, a cradle type, an access point (AP) type, or the like.

A wireless power reception device according to embodiments be used in small electronic devices such as a mobile phone, a smart phone, a laptop computer, a digital broadcasting terminal, a Personal Digital Assistants (PDA), a Portable Multimedia Player (PMP), a navigation device, an MP3 player, an electric toothbrush, an electronic tag, a lighting device, a remote controller, a fishing bobber, a wearable device such as a smart watch, or the like, but is not limited thereto. The wireless power reception device may be any mobile device as long as it can be charged by a battery equipped with a wireless power reception device according to an embodiment.

Embodiments may consider a system capable of transferring power to one or more electronic devices by using a wireless power transmission device including one or more transmission coils.

Terms used in embodiments are as follows.

Wireless Power Transfer System: A system that provides wireless power transfer in a magnetic field area.

Wireless power transmission device (Wireless Power Transfer System-Charger): A device that provides wireless power transfer to an electronic device in a magnetic field area and manages an overall system.

Wireless power reception device (Wireless Power Receiver): A device that receives wireless power transfer from a wireless power transmission device in a magnetic field area.

Charging area: An area where wireless power transfer is performed in a magnetic field area and which may be changed in accordance with the size, requested power, and operation frequency of an application product such as an electronic device.

The principle of wireless power transfer will be described. The principle of wireless power transfer is largely divided into a magnetic induction scheme and an electromagnetic resonance scheme.

The magnetic induction scheme is a non-contact energy transfer technology in which, when a source inductor and a load inductor approach each other, an electromotive force is generated in the load inductor by the medium of magnetic flux generated as current flows in the source inductor. The electromagnetic resonance scheme is a technology for wirelessly transferring energy by using a resonance technique in which as magnetic resonance is generated by a natural frequency between two resonators by coupling the two resonators, the two resonators form electric and magnetic fields in the same wavelength range while vibrating at the same frequency.

Figure 4:
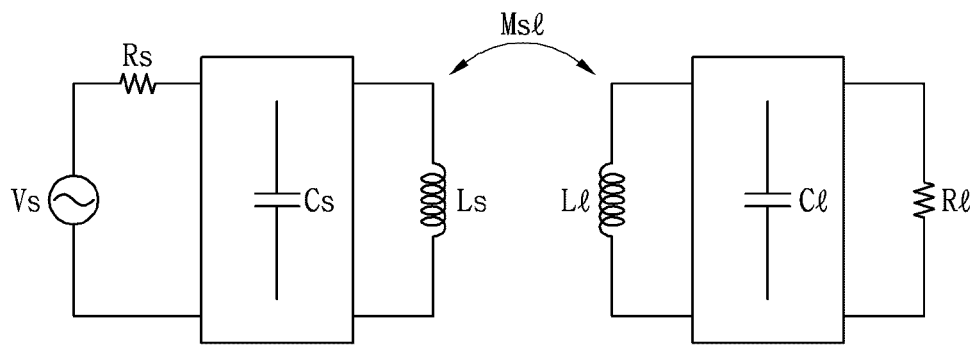
FIG. 4 is an equivalent circuit diagram of a magnetic induction scheme.

FIG. 4 is an equivalent circuit diagram of a magnetic induction scheme.

Referring to FIG. 4, in the equivalent circuit of the magnetic induction scheme, a wireless power transmission device may be implemented by a source voltage Vs according to a device for supplying power, a transmission resistor Rs, a transmission capacitor Cs for impedance matching, and a transmission coil Ls for a magnetic coupling with a wireless power reception device. The wireless power reception device may be implemented by a load resistor Ll that is an equivalent resistor of the wireless power reception device, a load capacitor for impedance matching, and a load coil Ll for a magnetic coupling with the wireless power transmission device, wherein the degree of magnetic coupling between the transmission coil Ls and the load coil Ll may be denoted by a mutual inductance Msl.

As a compensation capacitor for impedance matching, the transmission capacitor Cs may be added to the wireless power transmission device, and the load capacitor Cl may be added to the wireless power reception device. The compensation capacitors Cs and Cl may be connected in series or parallel to each of the reception coil Ls and the load coil Ll, for example. In addition to the compensation capacitors, passive elements such as an additional capacitor and an additional inductor may be further added to each of the wireless power transmission device and the wireless power reception device.

Figure 5:
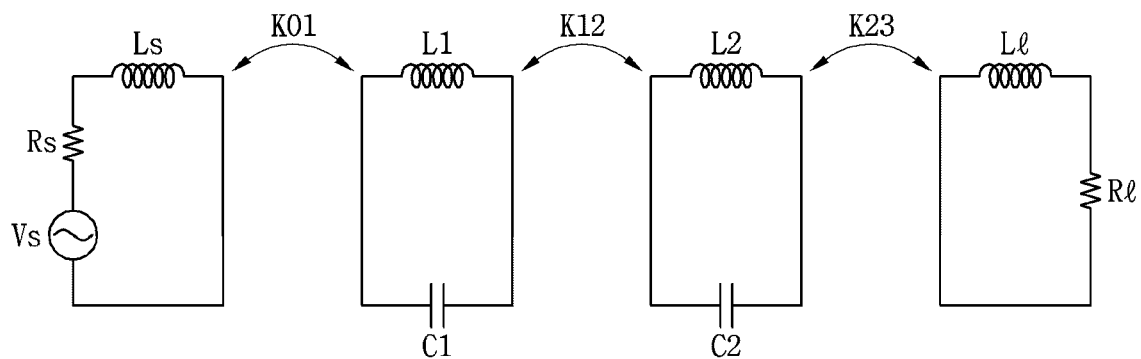
FIG. 5 is an equivalent circuit diagram of an electromagnetic resonance scheme.

FIG. 5 is an equivalent circuit diagram of an electromagnetic resonance scheme.

Figure 2:
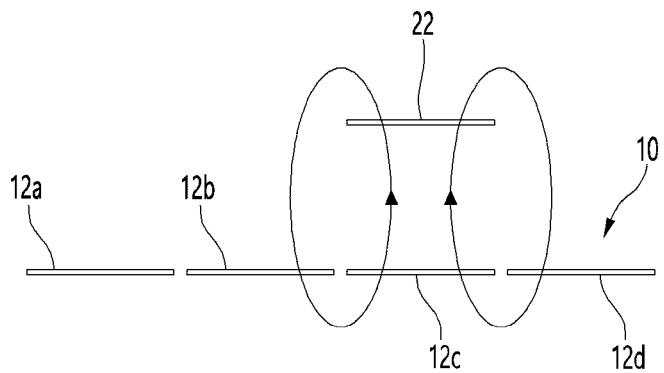
FIG. 2 shows a charging state when a conventional wireless power reception device is disposed parallel to a wireless power transmission device.
Figure 3:
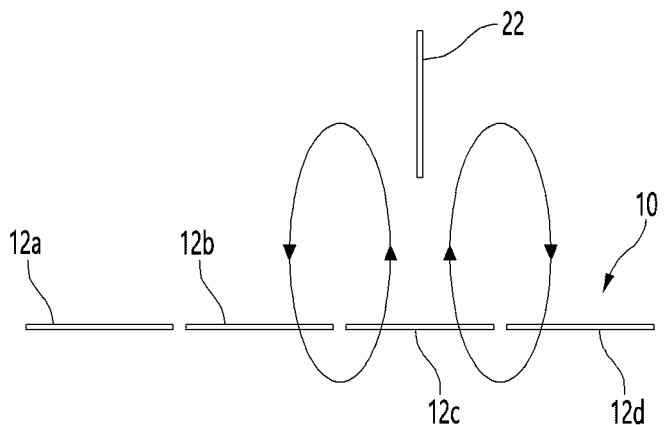
FIG. 3 shows a conventional charging state when a wireless power reception device is disposed perpendicular to a wireless power transmission device.

Referring to FIG. 2, in the equivalent circuit of the electromagnetic resonance scheme, a wireless power transmission device is implemented by a source coil forming a closed loop circuit through a serial connection of a source voltage Vs, a transmission resistor Rs, and a transmission inductor Ls, and a resonant coil forming a closed loop circuit through a serial connection of a resonant inductor L1 and a resonant capacitor C1. A wireless power reception device is implemented by a load coil forming a closed loop circuit through a serial connection of a load resistor Rl and a load inductor Ll, and a resonant coil forming a closed loop circuit through a serial connection of a resonant inductor L2 and a resonant capacitor C2. The transmission inductor Ls and the inductor L1 are magnetically coupled with a coupling coefficient of K01, the load inductor Ll and the road-side resonant inductor L2 are magnetically coupled with a coupling coefficient of K23, and the resonant inductor L1 and the resonant inductor L2 are magnetically coupled with a coupling coefficient of K12. An equivalent circuit according to another embodiment may be implemented by only a resonant coil and a resonant coil without a source coil and/or a load coil.

In the electromagnetic resonance scheme, most of the energy in a resonator of the wireless power transmission device is transmitted to a resonator of the wireless power reception device when the resonance frequencies of the two resonators are equal to each other, so that the power transfer efficiency may be improved.

In the electromagnetic resonance scheme, elements for the impedance matching may be added to improve the efficiency, and the impedance matching elements may be passive elements such as an inductor and a capacitor.

A wireless power transfer system for transferring power in the magnetic induction scheme or the electromagnetic resonance scheme based on the principle of wireless power transfer will be described below.

<Wireless Power Transmission Device>

Figure 6A:
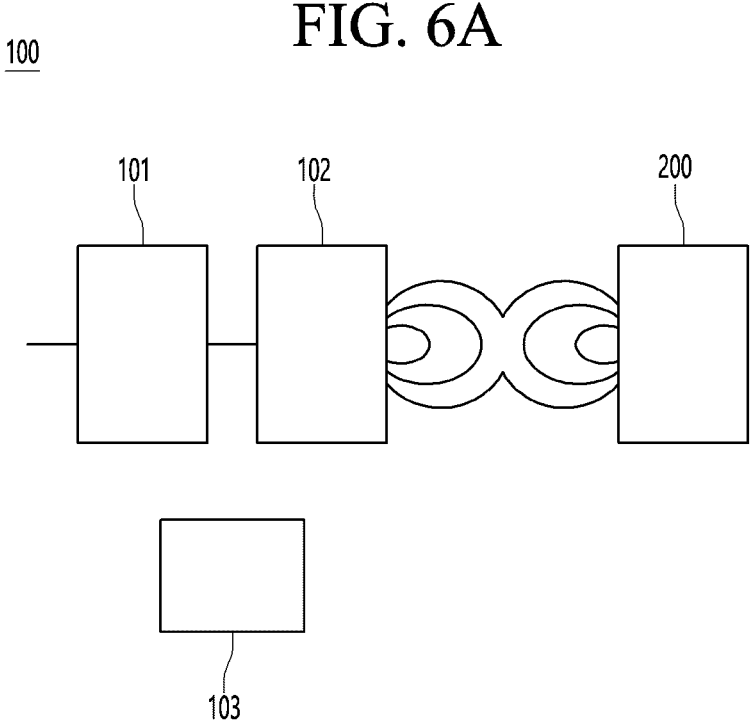

FIGS. 6a and 6b are block diagrams illustrating a wireless power transmission device as one of wireless power transfer systems.

Referring to FIG. 6a, a wireless power transfer system according to an embodiment may include a wireless power transmission device 100 and a wireless power reception device 200 that wirelessly receives power from the wireless power transmission device 100. For example, the wireless power reception device 200 may include a wireless power reception device that receives power wirelessly, but is not limited thereto.

The wireless power transmission device 100 may include a power conversion unit 101 that performs power conversion on an input AC signal to output an AC signal, a resonant circuit unit 102 that generates a magnetic field on the basis of the AC signal output from the power conversion unit 101 to provide power to the wireless power reception device 200 in a charging area, and a control unit 103 that controls the power conversion of the power conversion unit 101, adjusts an amplitude and a frequency of an output signal of the power conversion unit 101, performs impedance matching of the resonant circuit unit 102, senses information on impedance, voltage, and current from the power conversion unit 101 and the resonant circuit unit 102, and performs wireless communication with the wireless power reception device 200.

The power conversion unit 101 may include at least one of a power conversion unit for converting an AC signal into a DC signal, a power conversion unit for outputting a DC signal by varying a level of the DC signal, and a power conversion unit for converting a DC signal to an AC signal. In addition, the resonant circuit unit 102 may include a coil and an impedance matching unit capable of resonating with the coil. In addition, the control unit 103 may include a sensing unit for sensing information on impedance, voltage, and current and a wireless communication unit. For example, the sensing unit may include a current measurement unit that measures a current, but is not limited thereto. For example, the communication unit may be able to perform communication in a Bluetooth method. For example, the communication unit may be able to perform communication in an in-band communication method or an out-of-band communication method.

Specifically, referring to FIG. 6b, the wireless power transmission device 100 may include an AC/DC conversion unit 110, a DC/AC conversion unit 120, an impedance matching unit 130, a transmission coil unit 140, and a communication and control unit 150.

The AC/DC conversion unit 110 is a power conversion unit that converts an AC signal received from the outside into a DC signal under the control of the communication and control unit 150. The AC/DC conversion unit 110 may be a sub-system including a rectifier 112 and a transmission-side DC/DC conversion unit 114.

The rectifier 112 is a system for converting the supplied AC signal into the DC signal. A diode rectifier having relatively high efficiency when operating at high frequencies, a synchronous rectifier prepared as one-chip, or a hybrid rectifier capable of reducing cost and space and having a high degree of freedom of dead time may be used as an embodiment for implementing the rectifier 112. However, the present disclosure is not limited thereto, and any system for converting an AC signal into a DC signal may be applied.

In addition, the DC/DC conversion unit 114 adjusts a level of the DC signal provided by the rectifier 112 under the control of the communication and control unit 150. A buck converter that lowers a level of the input signal, a boost converter that increases the level of the input signal, and a buck boost converter or a Cuk converter that lowers or increases the level of the input signal may be used and as an embodiment for implementing the DC/DC conversion unit 114. In addition, the DC/DC conversion unit 114 may include a switch element that controls a power conversion, an inductor and a capacitor that serve as power conversion medium or smooth the output voltage, and a transformer that adjusts a voltage gain or performs an electrical separation (insulation) function, and may remove a ripple component or a pulsation component included in the input DC signal (AC component included in DC component). Further, an error between a command value of the output signal of the DC/DC conversion unit 114 and an actual output value may be adjusted through a feedback scheme, which may be performed by the communication and control unit 150.

The DC/AC conversion unit 120 is a system capable of converting the DC signal outputted from the AC/DC conversion unit 110 into the AC signal under the control of the communication and control unit 150 and adjusting a frequency of the converted AC signal. A half bridge inverter or a full bridge inverter may be used as an embodiment for implementing the DC/AC conversion unit 120. In addition, various amplifiers for converting a DC signal into an AC signal may be applied to the wireless power transfer system, and examples of the amplifiers include class A, B, C, E, and F amplifiers. In addition, the DC/AC conversion unit 120 may include an oscillator that generates the frequency of the output signal and a power amplification unit that amplifies the output signal.

The impedance matching unit 130 minimizes a reflection wave at a position at which impedances are different, thereby improving a signal flow. Since two coils of the wireless power transmission device 100 and the wireless power reception device 200 are spatially separated from each other, a large amount of magnetic field leaks out. Accordingly, the efficiency of power transfer can be improved by compensating for the impedance difference between two connecting parts of the wireless power transmission device 100 and the wireless power reception device 200. The impedance matching unit 130 may include an inductor, a capacitor, and a resistor, and may adjust an impedance value for the impedance matching by varying an inductance of the inductor, a capacitance of the capacitor, and a resistance of the resistor under the control of the communication and control unit 150.

In addition, when the wireless power transfer system transfers power by the magnetic induction scheme, the impedance matching unit 130 may have a serial resonance structure or a parallel resonance structure, and energy loss may be minimized by increasing an induction coupling coefficient between the wireless power transmission device 100 and the wireless power reception device 200.

Further, when the wireless power transfer system transfers power by the electromagnetic resonance scheme, the impedance matching unit 130 allows the impedance to be matched in real time according to a change in the distance between the wireless power transmission device 100 and the wireless power reception device 200 or mutual influence from metallic foreign objects (FO) and various devices, and a multiple matching scheme using a capacitor, a matching scheme using multiple antennas, a scheme using multiple loops may be used as the compensation scheme.

The coil unit 140 may be implemented by a plurality of coils or a single coil. When the coil unit 140 includes a plurality of coils, the coils may be spaced apart from each other or overlap one another. When the coils overlap one another, an overlapped area may be determined by taking into account a deviation of a magnetic flux density. In addition, the coil unit 140 may be produced by taking into account an internal resistance and a radiation resistance. In this case, when the resistance component is small, the quality factor and the transmission efficiency may be improved.

The communication and control unit 150 may include a control unit 152 and a communication unit 154. The control unit 152 may function to adjust the output voltage of the AC/DC conversion unit 110 by taking into account an amount of required power, a currently charged amount of the wireless power reception device 200, and a wireless power scheme. In addition, power to be transmitted may be controlled by generating a frequency and a switching waveform to drive the DC/AC conversion unit 120 by taking into account the maximum power transfer efficiency. In addition, the control unit 152 may determine the size of the wireless power reception device based on unique information (RXID) received from the wireless power reception device. That is, one of a plurality of transmission coils may be selected according to the size of the wireless power reception device. Unique information (RXID) may include an RXID message, certification information (certification version), identification information, and error detection code (CRC), but is not limited thereto. The RXID message may include information on the size of the wireless power reception device and an amount of power.

Further, an algorithm, a program, or an application required for the control which is read from a storage unit (not shown) of the wireless power reception device 200 may be used to control an overall operation of the wireless power reception device 200. Meanwhile, the controller 152 may also be referred to as a microprocessor, a micro-controller unit, or a micom. The communication unit 154 may communicate with a communication unit 264, and may use a short-range communication scheme such as Bluetooth, NFC, or Zigbee as an example of a communication scheme. The communication unit 154 and the communication unit 264 may transmit and receive charging status information and charging control commands with each other. In addition, the charging status information may include the number of wireless power reception devices 2000, a remaining battery level, the number of charging operations, an amount of usage, a battery capacity, a ratio of a battery, and an amount of transmitted power of the wireless power transmission device 100. In addition, the communication unit 154 may transmit a charging function control signal to control a charging function of the wireless power reception device 200, and the charging function control signal may be a control signal for enabling or disabling the charging function by controlling the wireless power reception device 200.

As described above, the communication unit 154 may perform communication by using an out-of-band scheme in which the communication unit 154 is configured as a separate module, but is not limited thereto. The communication unit 154 may perform communication in an in-band scheme in which the wireless power reception device uses a feedback signal to be transmitted to the wireless power transmission device by using a power signal transmitted by the wireless power transmission device. For example, the wireless power reception device may modulate a feedback signal to transfer information on a charging start, a charging end, a battery status, and the like to the wireless power transmission device through the feedback signal. In addition, the communication unit 154 may be configured separately from the control unit 152, and the communication unit 264 of the wireless power reception device 200 may be included in a control unit 262 of the wireless power reception device or may be configured separately from the control unit 264.

<Wireless Power Reception Device>

Figure 7:
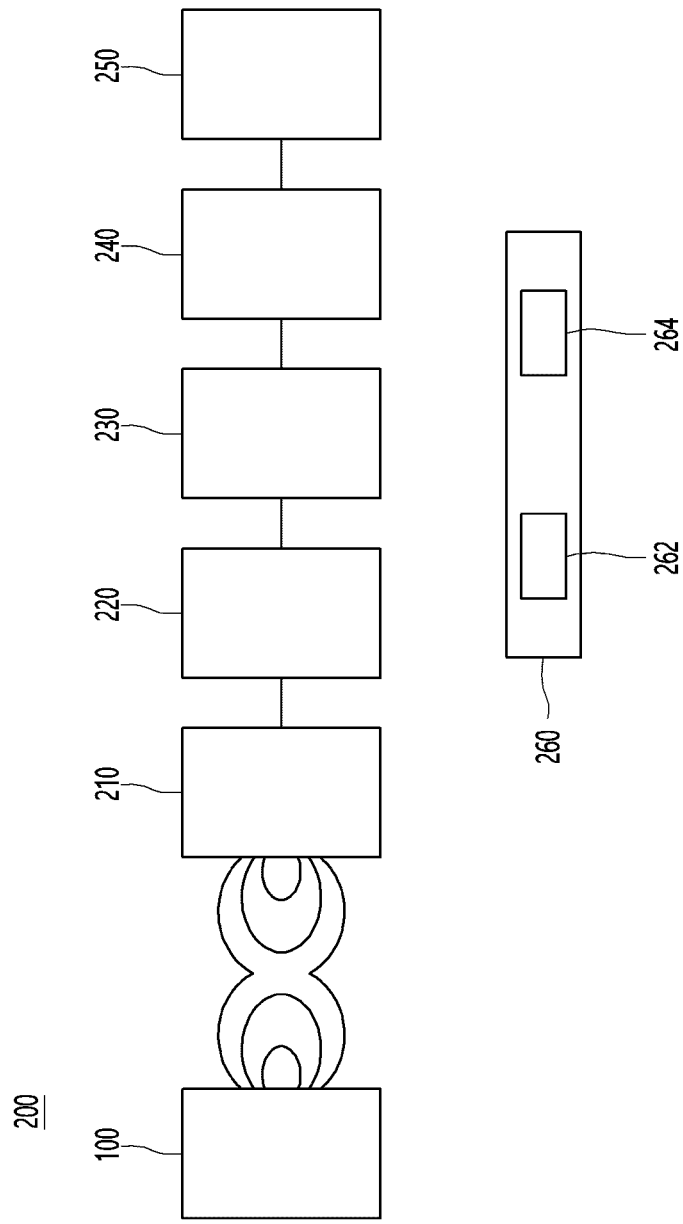
FIG. 7 is a block diagram illustrating an electronic device as one of wireless power transfer systems.

FIG. 7 is a block diagram illustrating a wireless power reception device that is one of wireless power transfer systems.

Referring to FIG. 7, the wireless power transfer system according to an embodiment may include a wireless power transmission device 100 and a wireless power reception device 200 that wirelessly receives power from the wireless power transmission device 100. The wireless power reception device 200 may include a reception coil unit 210, an impedance matching unit 220, an AC/DC converter 230, a DC/DC converter 240, a load 250, and a communication and control unit 260.

The reception coil 210 may receive power through the magnetic induction method or the magnetic resonance method. As such, at least one of an induction coil and a resonant coil may be included according to a power receiving method. The reception coil unit 210 may be provided with an antenna for near field communication (NFC). The reception coil unit 210 may be the same as the coil unit 140 and the dimensions of a receiving antenna may depend on the electrical characteristic of the wireless power reception device 200.

The impedance matching unit 220 may perform impedance matching between the wireless power transmission device 100 and the wireless power reception device 200.

The AC/DC converter 230 generates a DC signal by rectifying an AC signal output from the reception coil unit 210.

The DC/DC converter 240 may adjust the level of the DC signal output from the AC/DC converter 230 to fit the capacity of the load 250.

The load 2500 may include a battery, a display, a voice output circuit, a main processor, and various sensors.

The communication and control unit 260 may be activated by wake-up power from the communication and control unit 150, communicate with the communication and control unit 150, and control operations of the sub-systems of the wireless power reception device 200.

One or a plurality of wireless power reception devices 200 may be provided and may 100 simultaneously receive energy from the wireless power transmission device in a wireless manner. That is, in a wireless power transfer system using the magnetic resonance method, a plurality of target power receivers 200 may receive power from one wireless power transmission device 100. The matching unit 130 of the wireless power transmission device 100 may adaptively perform impedance matching among the plurality of power receivers 200. This may be applied in the same way even though a plurality of independent coil units is provided in the magnetic induction method.

In addition, when a plurality of wireless power reception devices 200 are provided, the systems may have the same power reception scheme or different power reception schemes. In this case, the wireless power transmission devices 100 may be a system that transfers power using magnetic induction or magnetic resonance, or a system that uses both of magnetic induction and magnetic resonance.

Figure 8:
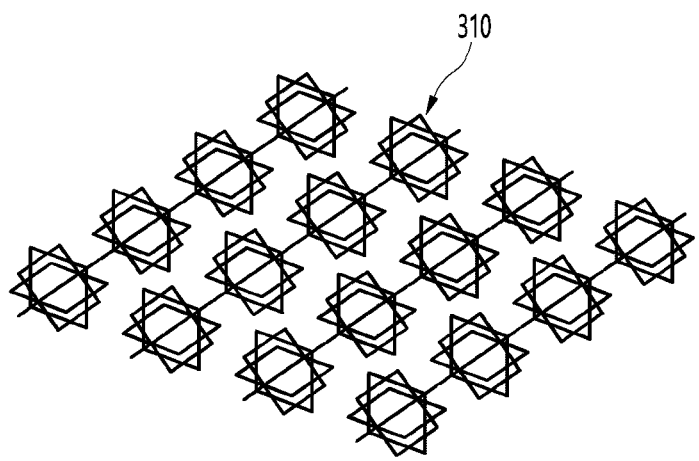
FIG. 8 shows a transmission unit according to a first embodiment.

FIG. 8 shows a transmission unit according to a first embodiment.

Referring to FIG. 8, a transmission unit according to the first embodiment may include a plurality of transmission coil units 310.

For example, the plurality of transmission coil units 310 may be disposed on the same plane. For example, the plurality of transmission coil units 310 may be arranged in a matrix.

Although it is illustrated in FIG. 8 that a total of 16 transmission coil units 310 are arranged in a matrix of 4 rows and 4 columns, fewer or more transmission coil units may be provided according to an embodiment.

Although not shown, the plurality of transmission coil units 310 may be accommodated in a housing.

Figure 9:
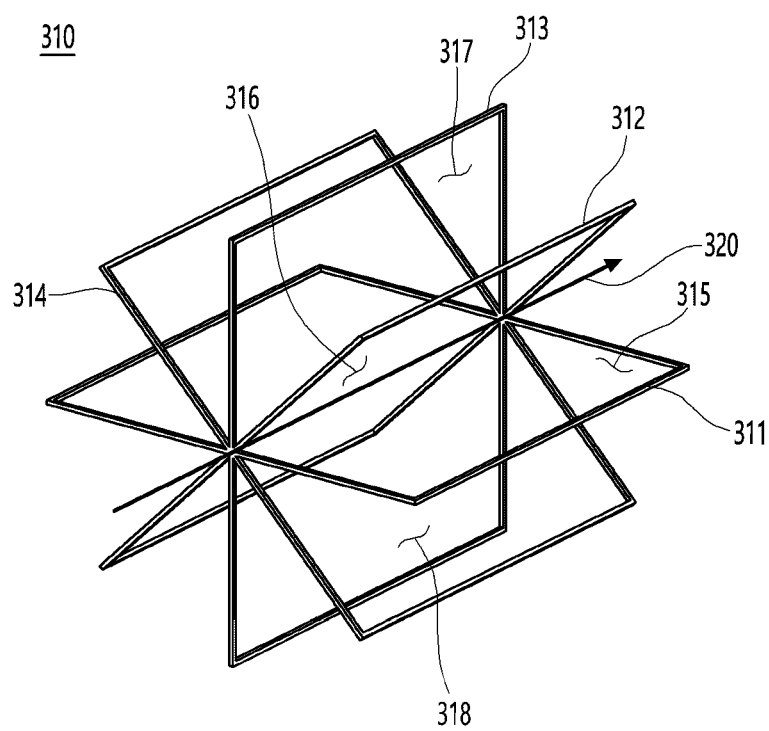
FIG. 9 is a perspective view illustrating a transmission coil unit of FIG. 8.

FIG. 9 is a perspective view illustrating a transmission coil unit of FIG. 8.

The transmission coil unit shown in FIG. 9 shows one of the plurality of transmission coil units 310 shown in FIG. 8, and the other transmission coil unit 310 shown in FIG. 8 may have the same structure, shape and/or size as the transmission coil unit shown in FIG. 9, but is not limited thereto.

As shown in FIG. 9, the transmission coil unit 310 may include a plurality of antennas 311 to 314 having multi-dimensional planes arranged between 0 degrees and 359 degrees with respect to a specific axis 320. For example, the specific axis 320 may be an x-axis, but is not limited thereto.

The multi-dimensional planes may mean a plurality of planes on which the plurality of antennas 311 to 314 are disposed. As shown in FIG. 9, a first plane 315 may coincide with a horizontal plane, and a first antenna 311 may be disposed on the first plane 315. A second plane 316 may be different from the first plane 315 and a second antenna 312 may be disposed on the second plane 316. A third plane 317 may be different from the first plane 315 or the second plane 316 and a third antenna 313 may be disposed on the third plane 317. A fourth plane 318 may be different from the first plane 315, the second plane 316 or the third plane 317 and the fourth antenna 314 may be disposed on the fourth plane 318. For example, the second plane 316 may be defined by being rotated by 45 degrees with respect to the first plane 315, the third plane 317 may be defined by being rotated by 90 degrees with respect to the first plane 315, and the fourth plane 318 may be defined as being rotated by 135 degrees with respect to the first plane 315, but is not limited thereto.

For example, each of the plurality of transmission coil units 310 shown in FIG. 8 may include a plurality of antennas 311 to 314 having multi-dimensional planes disposed between 0 degrees and 359 degrees with respect to the x-axis 320.

As another example, each of the plurality of transmission coil units 310 shown in FIG. 8 may include a plurality of antennas having multi-dimensional planes disposed between 0 degrees and 359 degrees with respect to different axes. For example, the first transmission coil unit may include a plurality of antennas having multi-dimensional planes arranged between 0 degrees and 359 degrees with respect to a first axis, the second transmission coil unit may include a plurality of antennas having multi-dimensional planes arranged between 0 degrees and 359 degrees with respect to a second axis, and the third transmission coil unit may include a plurality of antennas having multi-dimensional planes arranged between 0 degrees and 359 degrees with respect to a third axis Here, the first to third axes may be perpendicular to each other, but are not limited thereto. For example, the first axis and the second axis may intersect each other at an angle of 60 degrees, the first axis and the third axis may intersect each other at an angle of 100 degrees, and the second axis and the third axis may intersect each other at an angle of 120 degrees.

Figure 10:
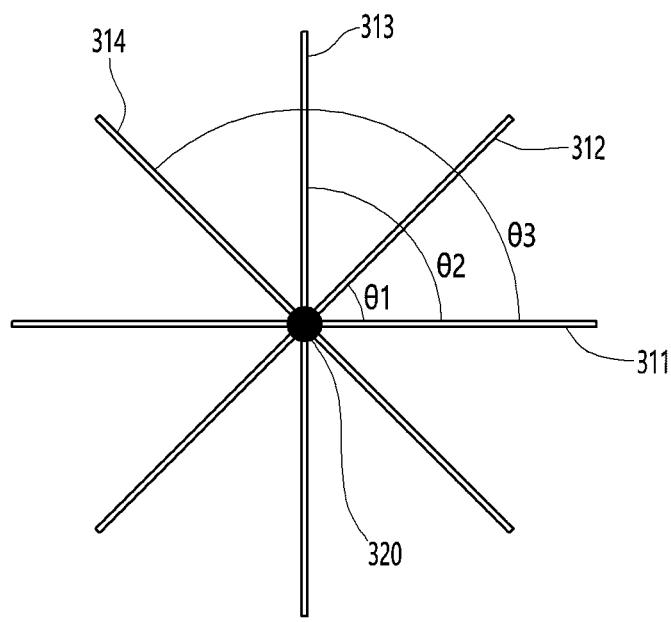
FIG. 10 is a plan view illustrating a transmission coil unit of FIG. 8.

As shown in FIG. 10, the first antenna 311 may be disposed on a horizontal plane. The second antenna 312 may be rotated at an angle of $\theta 1$ with respect to the first antenna 311 around the specific axis 320 and disposed. The third antenna 313 may be rotated at an angle of $\theta 2$ with respect to the first antenna 311 around the specific axis 320 and disposed. The fourth antenna 314 may be rotated at an angle of $\theta 3$ with respect to the first antenna 311 around the specific axis 320 and disposed. For example, $\theta 1$ may be 45 degrees, $\theta 2$ may be 90 degrees, and $\theta 3$ may be 135 degrees, but are not limited thereto.

In FIG. 9, the first to fourth antennas 311 to 314 are disposed at regular intervals of 45 degrees, but may be disposed at non-regular or random intervals.

Although four antennas 311 to 314 are shown in FIG. 9 for convenience, more antennas may be provided.

A magnetic field may be formed in each of the plurality of antennas 311 to 314 of the transmission coil unit when a current flows.

Figure 11A:
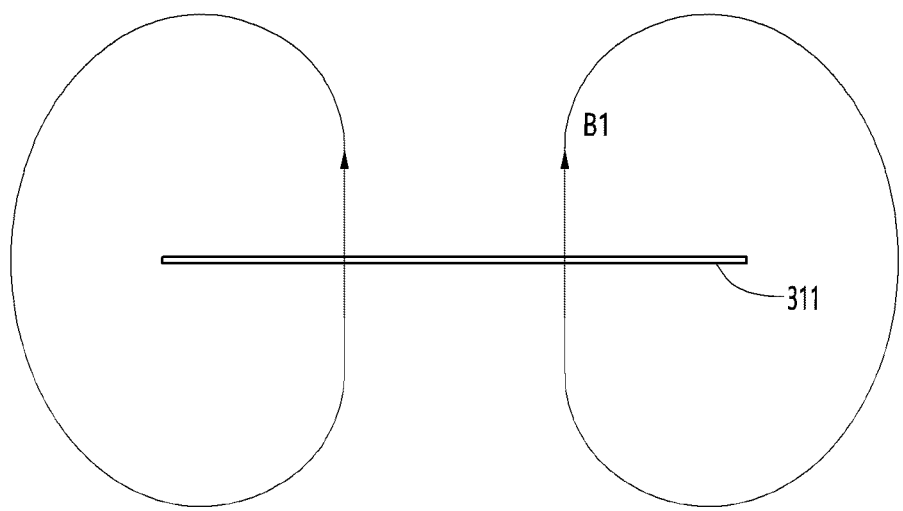
FIGS. 11a to 11d show magnetic fields of each of a plurality of antennas of the transmitting coil unit of FIG. 8.

As shown in FIG. 11a, when a first current flows in a counterclockwise direction through the first antenna 311 parallel to the horizontal plane, a first magnetic field B1 may be generated by passing through the first antenna 311 from the lower side of the first antenna 311 to the upper side of the first antenna 311.

Figure 11B:
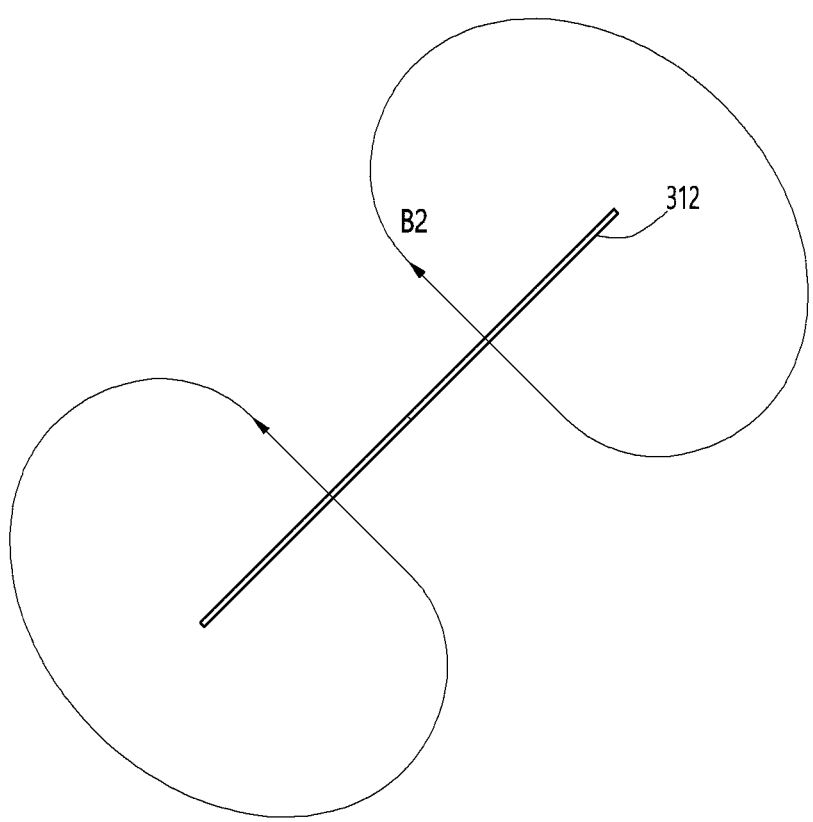

As shown in FIG. 11b, when a second current flows in a counterclockwise direction through the second antenna 312 rotated by $\theta 1$ with respect to the first antenna 311, a second magnetic field B2 may be generated by passing through the second antenna 312 from the lower side of the second antenna 312 to the upper side of the second antenna 312.

Figure 11C:
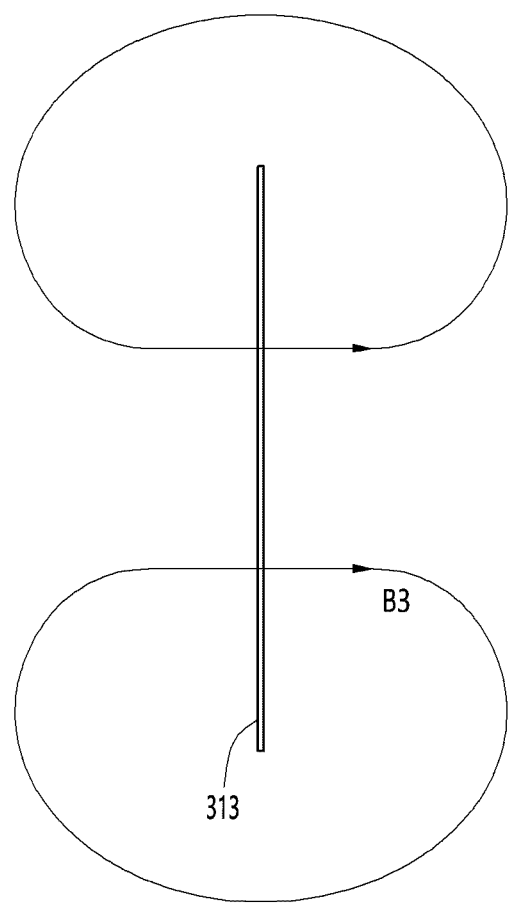

As shown in FIG. 11c, when a third current flows in a counterclockwise direction through the third antenna 313 rotated by $\theta 2$ with respect to the first antenna 311, a third magnetic field B3 may be generated by passing through the third antenna 313 from the left side of the third antenna 313 to the right side of the third antenna 313.

Figure 11D:
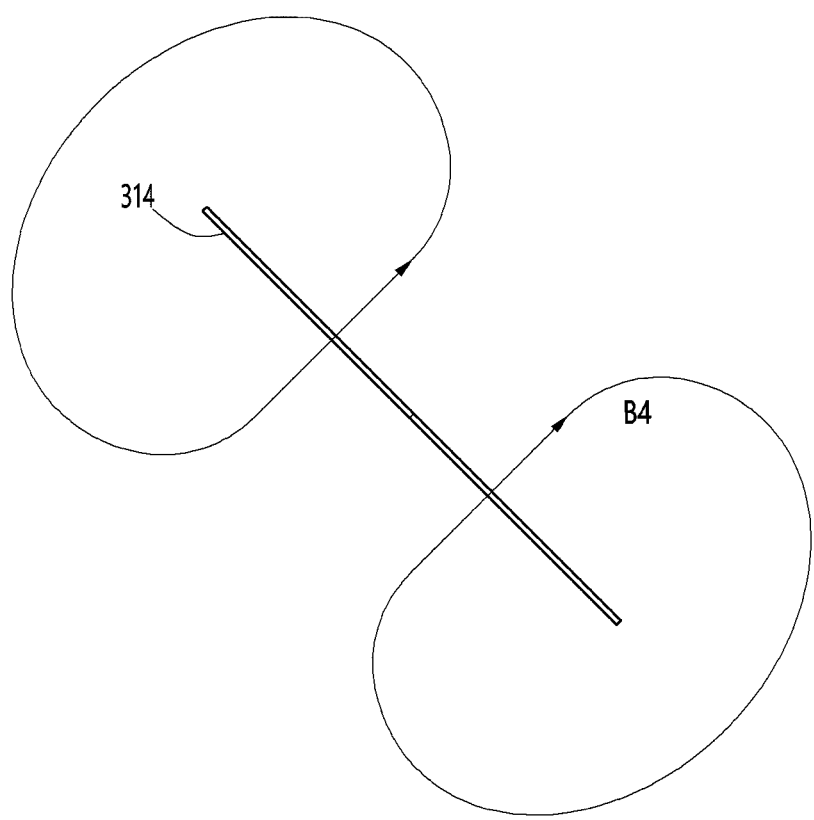

As shown in FIG. 11d, when a fourth current flows in a counterclockwise direction through the fourth antenna 314 rotated by $\theta 3$ with respect to the first antenna 311, a fourth magnetic field B4 may be generated by passing through the fourth antenna 314 from the left side of the fourth antenna 314 to the right side of the fourth antenna 314.

For example, when the same current flows through the first to fourth antennas 311 to 314, the strengths of the magnetic fields B1 to B4 respectively generated by the first to fourth antennas 311 to 314 may be the same.

For example, when different currents flows through the first to fourth antennas 311 to 314 respectively, the strengths of the magnetic fields B1 to B4 respectively generated by the first to fourth antennas 311 to 314 may be different.

In an embodiment, the magnetic field generated by each of the plurality of antennas 311 to 314 of each of the plurality of transmission coil units 310 may be transmitted as transfer power to the wireless power reception device. That is, a current may be induced in the reception coil of the wireless power reception device by a magnetic field generated by each of the plurality of antennas 311 to 314 of each of the plurality of transmission coil units 310.

In an embodiment, since the plurality of antennas 311 to 314 of each of the plurality of transmission coil units 310 have different arrangement directions and different distances from the wireless power reception device, the magnetic fields respectively generated by the plurality of antennas 311 to 314 of each of the plurality of transmission coil units 310 may differently contribute to current induction of the reception coil of the wireless power reception device.

Typically, when a transmission coil that generates a magnetic field and a reception coil that induces a current are disposed in parallel with each other, more magnetic flux due to the magnetic field generated in the transmission coil passes through the reception coil, thereby inducing a larger current. Since less magnetic flux passes through the reception coil as the inclination of the reception coil increases with respect to the transmission coil, an induced current may also decrease.

In an embodiment, even when the reception coil of the wireless power reception device is disposed inclined with respect to the horizontal plane, the total sum of the magnetic fluxes respectively generated by the plurality of antennas of each of the plurality of transmission coil units of the wireless power reception device and passing through the reception coil is constant, securing the same power transfer efficiency or the same charging efficiency, regardless of the arrangement position or direction of the wireless power reception device.

Figure 12A:
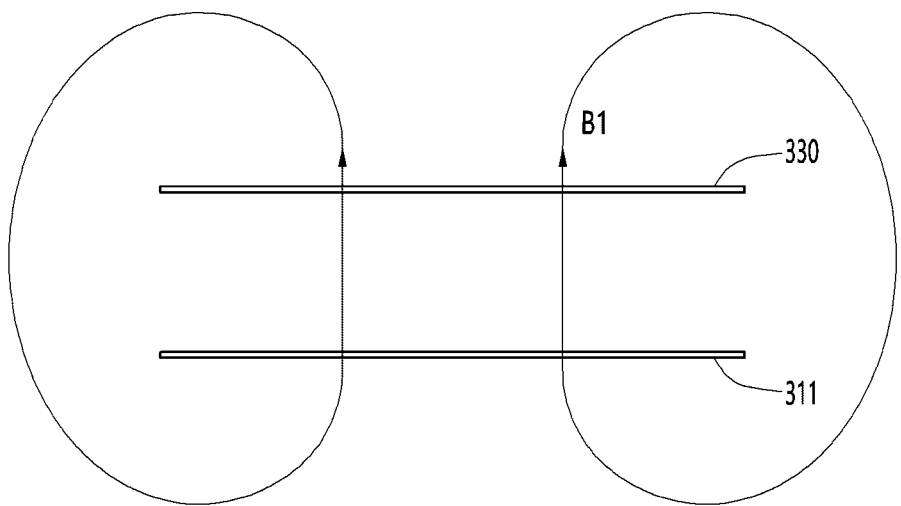
FIGS. 12a and 12b show a state where a magnetic field generated by at least one of a plurality of antennas is subjected to flux linkage with a reception coil of a wireless power reception device.

As shown in FIG. 12a, when the plane of the reception coil 330 of the wireless power reception device is disposed parallel to the horizontal plane, the plane of the first antenna 311 of the transmission coil unit 310 is parallel to the plane of the reception coil 330. Thus, the magnetic field B1 generated by the first antenna 311 of the transmission coil unit 310 may contribute the most to the current induction of the reception coil 330, and the magnetic fields generated by the other antennas 312 to 314 may contribute less than the first antenna 311 to the current induction of the reception coil 330. In other words, a current is induced in the reception coil 330 by the magnetic fields respectively generated by the first to fourth antennas 311 to 314 of the transmission coil unit 310, and in this case, the contributions of the magnetic fields respectively generated in the first to fourth antennas 311 to 314 may be different. For example, the first antenna 311 may contribute the most to the current generation in the reception coil 330, followed by the second antenna 312 or the fourth antenna 314, and then the third antenna 313 may contribute the least. In the reception coil 330 of the wireless power reception device, reception power may be determined as a sum of currents respectively induced by the magnetic fields of the first to fourth antennas 311 to 314 having different contributions.

Figure 12B:
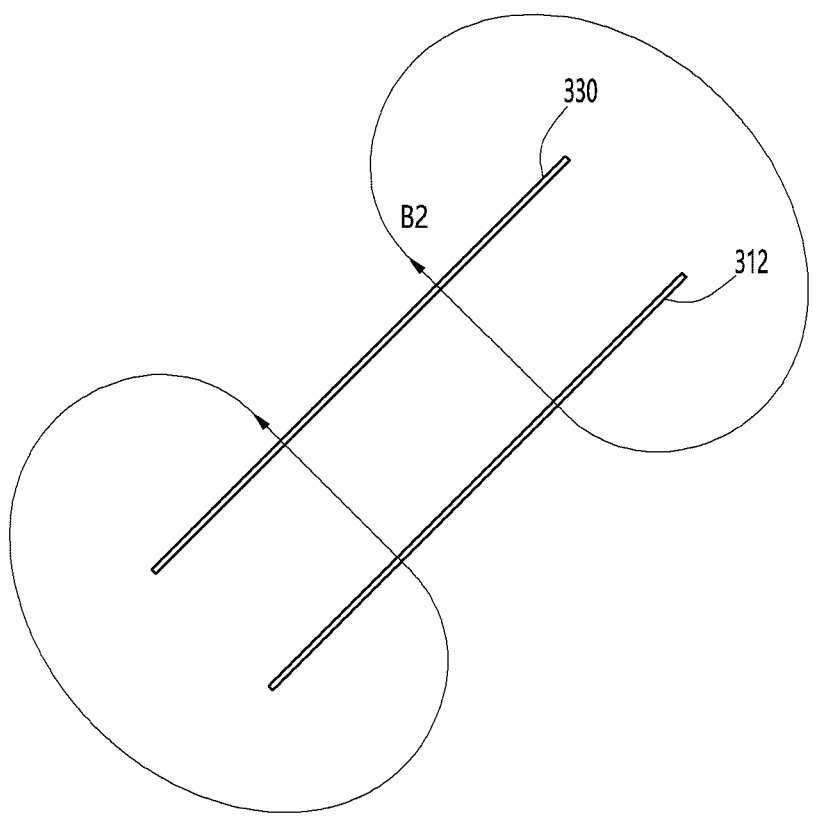

Similarly, as shown in FIG. 12b, when the plane of the reception coil 330 of the wireless power reception device is inclined at 45 degrees with respect to the horizontal plane, the plane of the second antenna 312 of the transmission coil unit 310 is parallel to the plane of the reception coil 330. Therefore, the magnetic field B2 generated by the second antenna 312 of the transmission coil unit 310 contributes the most to the current induction in the reception coil 330, and the magnetic fields respectively generated by the remaining antennas, that is, the first, third, and fourth antennas 311, 313, and 314 may contribute relatively little to the current induction in the reception coil 330. In other words, a current is induced in the reception coil 330 by the magnetic fields respectively generated by the first to fourth antennas 311 to 314 of the transmission coil 310, and in this case, the contributions of the magnetic fields respectively generated in the first to fourth antennas 311 to 314 may be different. For example, the second antenna 312 may contribute the most to the current generation in the reception coil 330, followed by the first antenna 311 or the third antenna 313, and then the fourth antenna 314 may contribute the least. In the reception coil 330 of the wireless power reception device, reception power may be determined as a sum of currents respectively induced by the magnetic fields of the first to fourth antennas 311 to 314 having different contributions.

As shown in FIGS. 12a and 12b, even when the arrangement position or direction of the wireless power reception device is changed, the sum of currents respectively induced by the magnetic fields of the first to fourth antennas 311 to 314 of the transmission coil unit 310 is the same, and accordingly, the reception power may also be the same. That is, even when the plane of the reception coil 330 of the wireless power reception device is not disposed parallel to the horizontal plane because the arrangement position or direction of the wireless power reception device is changed, the same power transfer efficiency may be secured.

Therefore, the embodiment may prevent a defect in which charging efficiency is reduced due to a significant decrease in power transfer efficiency as the arrangement position or arrangement direction of the wireless power reception device is changed in the prior art.

Meanwhile, in an embodiment, the same supply voltage may be supplied such that the same current flows through the plurality of antennas of each of the plurality of transmission coil units, or different supply voltages may be supplied such that different currents flow through the plurality of antennas of each of the plurality of transmission coil units.

Figure 13:
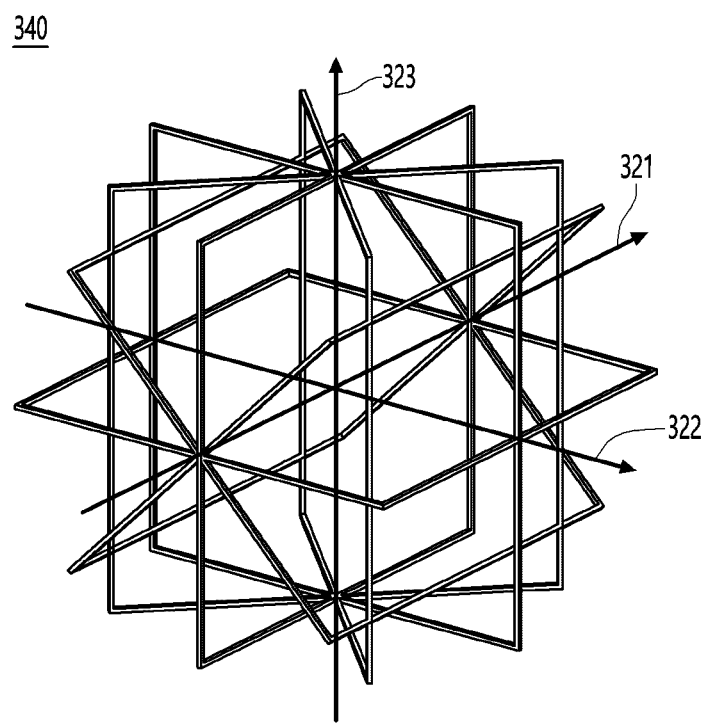
FIG. 13 is a perspective view showing another transmission coil unit according to an embodiment.

FIG. 13 is a perspective view showing another transmission coil unit according to an embodiment.

The transmission coil unit 340 shown in FIG. 13 shows one of the plurality of transmitting coil units 310 shown in FIG. 8, and the other transmission coil unit 310 shown in FIG. 8 may have the same structure, shape and/or size as the transmitting coil unit 340 shown in FIG. 13, but is not limited thereto.

As shown in FIG. 13, the transmission coil unit 340 may include a plurality of antennas having multi-dimensional planes arranged between 0 degrees and 359 degrees with respect to multiple axes 321 to 323. For example, the multiple axes 321 to 323 may include n axes having different directions from each other, but is not limited thereto.

For example, the plurality of antennas 311 to 314 shown in FIG. 9 may be disposed between 0 degrees and 359 degrees with respect to the multiple axes 321 to 323, respectively.

Although the antennas 311 to 314 are illustrated as having a rectangular shape in FIGS. 9 and 13, they may have various shapes. For example, the antennas 311 to 314 may have a circular shape, an elliptical shape, or a rectangular shape.

For example, in order to prevent a short circuit between the antennas 311 to 314, the antennas 311 to 314 may be coated with enamel around the coil, but is not limited thereto.

As shown in FIG. 13, since each of the plurality of transmission coil units 340 is provided with a plurality of antennas generating magnetic fields in more directions, constant power transfer efficiency can be secured even when the wireless power reception device is changed in various positions or directions, thus further expanding the degree of freedom in the direction or position of the wireless power reception device.

Figure 14:
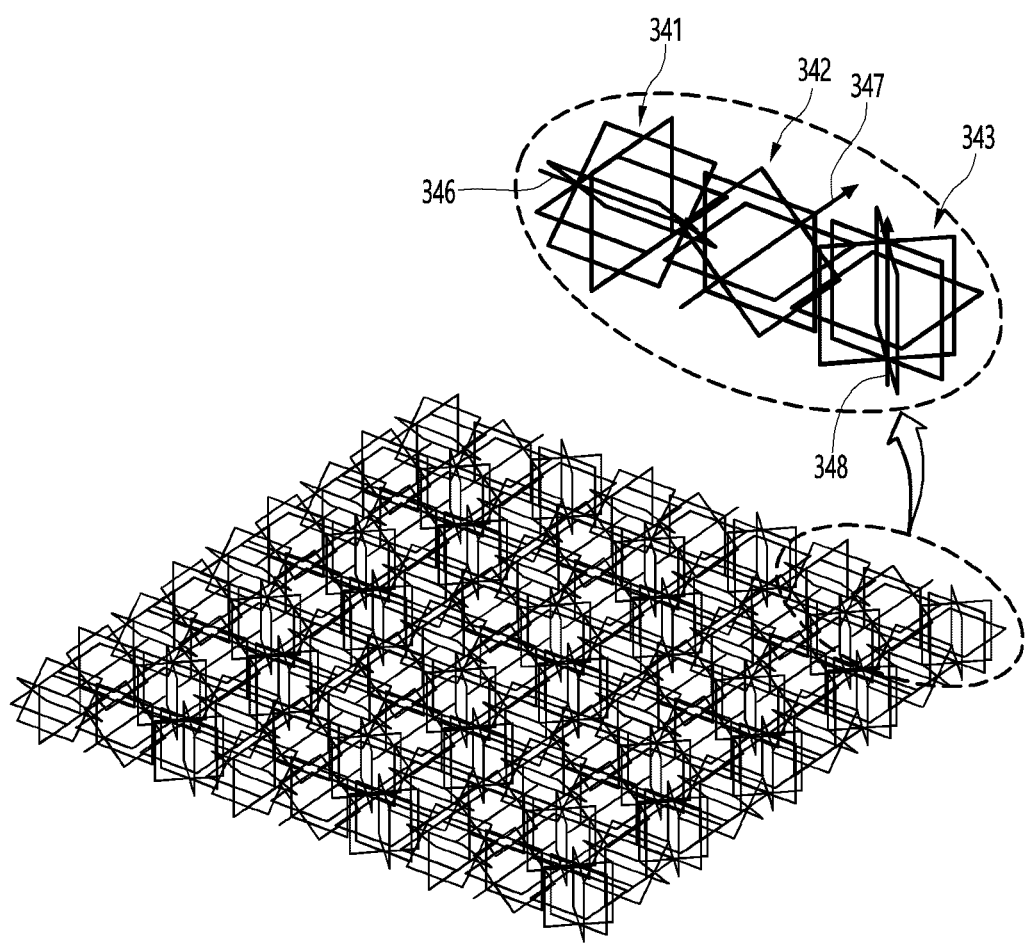
FIG. 14 shows a transmission unit according to a second embodiment.

FIG. 14 shows a transmission unit according to a second embodiment.

Referring to FIG. 14, a transmission unit according to the second embodiment may include a plurality of transmission coil units 341 to 343.

For example, the plurality of transmission coil units 341 to 343 may be disposed on the same plane. For example, the plurality of transmission coil units 341 to 343 may be arranged in a matrix.

Although it is illustrated in FIG. 8 that a total of 16 transmission coil units 341 to 343 are arranged in a matrix of 4 rows and 4 columns, fewer or more transmission coil units may be provided according to an embodiment.

Although not shown, the plurality of transmission coil units 341 to 343 may be accommodated in a housing.

Each of the plurality of transmission coil units 341 to 343 may include a plurality of antennas having multi-dimensional planes disposed between 0 degrees and 359 degrees with respect to different axes.

For example, each of the plurality of first transmission coil units 341 may include a plurality of antennas having multi-dimensional planes disposed between 0 degrees and 359 degrees with respect to a first axis 346. For example, each of the plurality of second transmission coil units 342 may include a plurality of antennas having multi-dimensional planes disposed between 0 degrees and 359 degrees with respect to a second axis 347. For example, each of the plurality of third transmission coil units 343 may include a plurality of antennas having multi-dimensional planes disposed between 0 degrees and 359 degrees with respect to a third axis 348. For example, the first axis 346 may indicate an x-axis, the second axis 347 may indicate a y-axis, and the third axis 348 may indicate a z-axis.

The first transmission coil unit 341, the second transmission coil unit 342, and the third transmission coil unit 343 may be arranged according to a predetermined rule or randomly. For example, the first transmission coil unit 341, the second transmission coil unit 342, the third transmission coil unit 343, the first transmission coil unit 341, the second transmission coil unit 342 and the third transmission coil unit 343 may be arranged in one direction in the order thereof. For example, the first transmission coil unit 341, the third transmission coil unit 343, the third transmission coil unit 343, the first transmission coil unit 341, the second transmission coil unit 342, and the second transmission coil unit 342 may be arranged in one direction in the order thereof.

Meanwhile, as an example, the plurality of antennas of each of the plurality of transmission coil units (310 in FIG. 8 or 341 to 343 in FIG. 14) may be formed of a single coil in which the plurality of antennas are connected to each other. For example, as shown in FIG. 9, the first antenna 311 is wound, the second antenna 312 is wound in such a way that one side of the first antenna 311 is extended to the second antenna 312, the third antenna 313 is wound in such a way that one side of the second antenna 311 is extended to the third antenna 313, and the fourth antenna 314 is wound in such a way that one side of the third antenna 311 is extended to the fourth antenna 313. In other words, the first to fourth antennas 311 to 314 may be formed by a single coil. In this case, a power supply (not shown) may be connected to the other side of the first antenna 311 and one side of the fourth antenna 314. Therefore, when the supply voltage is applied from the power supply, a current flows through the first antenna 311, the second antenna 312, the third antenna 313, and the fourth antenna 314 so that a magnetic fields may be generated in each of the first to fourth antennas 311 to 314 in a direction perpendicular to the plane of each of the first to fourth antennas 311 to 314.

Figure 15:
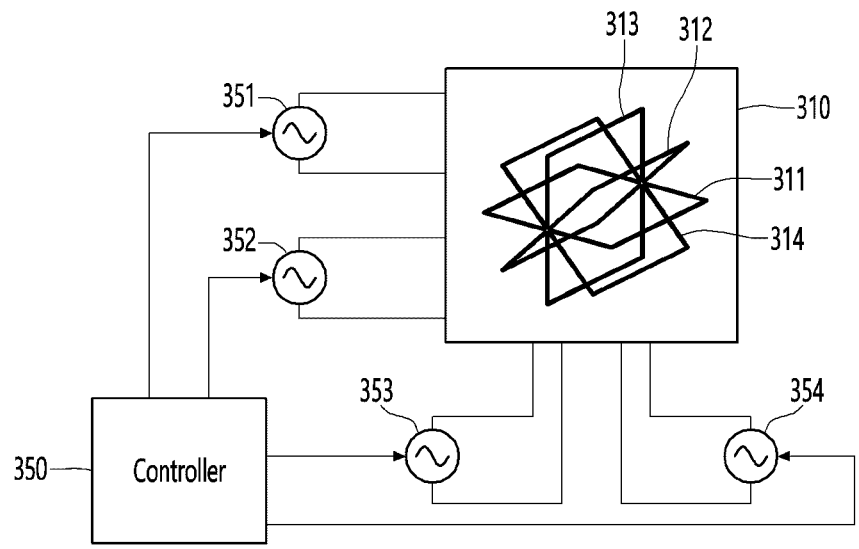
FIG. 15 shows a wireless power transmission device according to a first embodiment.

As another example, the antennas 311 to 314 of the plurality of transmission coil units (310 in FIGS. 8 and 341 to 343 in FIG. 14) may be formed as independent coils. For example, as shown in FIG. 9, the first antenna 311 may be formed of a first coil, the second antenna 312 may be formed of a second coil, the third antenna 313 may be formed of a third coil, and the fourth antenna 314 may be formed of a fourth coil. The first to fourth coils are not electrically connected to each other and are not integrally formed. In this case, the first to fourth antennas 311 to 314 may be individually connected to power supplies 351 to 354 (FIG. 15). Therefore, the magnetic field of the first antenna 311 may be generated by the supply voltage of a first power supply 351 (FIGS. 15, 18 and 20), and the magnetic field of the second antenna 312 may be generated by the supply voltage of a second power supply 352. The magnetic field of the third antenna 313 may be generated by the supply voltage of a third power supply 353, and the magnetic field of the fourth antenna 314 may be generated by the supply voltage of a fourth power supply 354.

FIG. 15 shows a wireless power transmission device according to a first embodiment.

Referring to FIG. 15, a wireless power transmission device according to the first embodiment may include a plurality of transmission coil units 310, a plurality of power supplies 351 to 354, and a controller 350.

The plurality of transmission coil units 310 may be arranged as shown in FIG. 8 or 14 or arranged in various other ways.

Hereinafter, for convenience, a description will be given limitedly with respect to the transmission coil unit 310 shown in FIG. 8.

Since the plurality of antennas of each of the plurality of transmission coil units 310 are formed of coils independent of each other, the power supplies 351 to 354 may be respectively and separately connected to the plurality of antennas in order to generate a magnetic field in each of these plurality of antennas.

For example, the plurality of power supplies 351 to 354 may be connected respectively to the plurality of antennas 311 to 314 of each of the plurality of transmission coil units 310.

As shown in FIG. 15, the first power supply 351 may be connected to the first antenna 311 and the second power supply 352 may be connected to the second antenna 312. Further, the third power supply 353 may be connected to the third antenna 313 and the fourth power supply 354 may be connected to the fourth antenna 314.

Each of the plurality of antennas 311 to 314 of each of the plurality of transmission coil units 310 may generate transmission power to be transmitted to the wireless power reception device by the supply voltage supplied from the power supplies 351 to 354. The magnitude of transmission power may be determined by the supply voltage supplied from the power supplies 351 to 354. For example, a current flows through the first antenna 311 by a supply voltage supplied from the first power supply 351, and a magnetic field passing through the first antenna 311 may be generated in proportion to the flowing current. Since the strength of the magnetic field is the magnitude of transmission power, the supply voltage supplied from the first power supply 351 may be increased to increase the magnitude of transmission power. Accordingly, the strength of the magnetic field and the size of the transmission power may be adjusted by adjusting the supply voltage of the first power supply 351.

The controller 350 may adjust the supply voltage of each of the power supplies 351 to 354 based on the arrangement position or direction of the wireless power reception device.

For example, the controller 350 may adjust the supply voltage of each of the power supplies 351 to 354 based on the mutual inductance of each of the plurality of antennas 311 to 314 of each of the plurality of transmission coil units 310 for the wireless power reception device.

Figure 16:
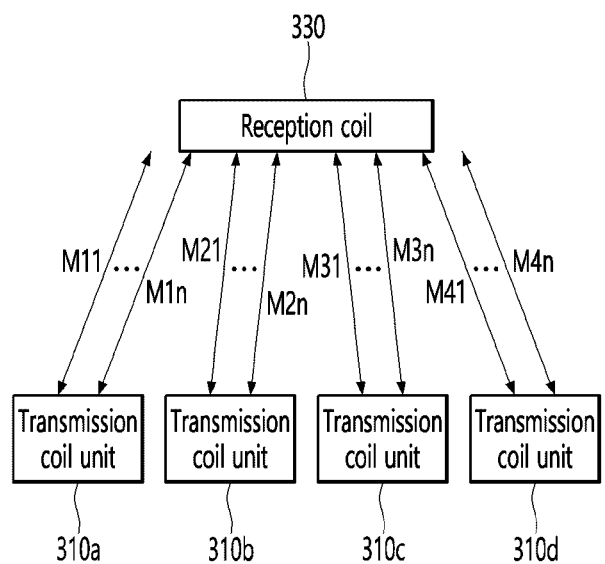
FIG. 16 shows mutual inductance between a reception coil and each of a plurality of antennas of a plurality of transmitting coil units.

When the wireless power reception device is disposed on the plurality of transmission coil units 310, as shown in FIG. 16, a mutual inductance is generated between the reception coil of the each of the wireless power reception device and each of the plurality of antennas 311 to 314 of each of the plurality of transmission coil units 310 for the wireless power reception device.

It is assumed that each of the plurality of transmission coil units 310*a* to 310*d* includes n antennas.

In the embodiment, it is assumed that each of the plurality of transmission coil units 310 includes n antennas for convenience of description, but more antennas may be provided.

In this case, n mutual inductances M11 to M1*n* may be respectively caused between the reception coil and the n antennas of the first transmission coil unit, and n mutual inductances M11 to M1*n* may be respectively generated between the reception coil and the n antennas of the second transmission coil unit. In addition, n mutual inductances M31 to M3*n* may be respectively generated between the reception coil and the n antennas of the third transmission coil unit, and n mutual inductances M41 to M4*n* may be respectively generated between the reception coil and the n antennas of the fourth transmission coil unit.

In this case, a magnetic channel represented by Equation 1 may be defined between the reception coil and each of the plurality of antennas 311 to 314 of each of the plurality of transmission coil units 310.

$$m_{nk} = \frac{j\omega M_{nk}}{R_L + Z_L} \quad \text{[Equation 1]}$$

$m_{nk}$ denotes a magnetic channel, $M_{nk}$ denotes a mutual inductance, $R_L$ denotes a resistance of the wireless power reception device, and $Z_L$ denotes an impedance of the wireless power reception device.

When the mutual inductance is obtained from Equation 1, a magnetic channel may be obtained based on the obtained mutual inductance.

A weight represented by Equation 2 may be obtained using the obtained magnetic channel.

$$\beta_{nk} = \frac{m_{nk}^*}{\|m\|} \quad \text{[Equation 2]}$$

$\beta_{nk}$ denotes a weight, $m^*_{nk}$ denotes a magnetic channel having a vector value, and $\|m\|$ denotes the sum of all magnetic channels.

For example, the weight may be a beamforming vector corresponding to the obtained mutual inductance.

The controller 350 may adjust the supply voltage of the power supplies 351 to 354 according to the weight of each of the plurality of antennas 311 to 314 of the plurality of transmission coil units 310 for the wireless power reception device.

Figure 17:
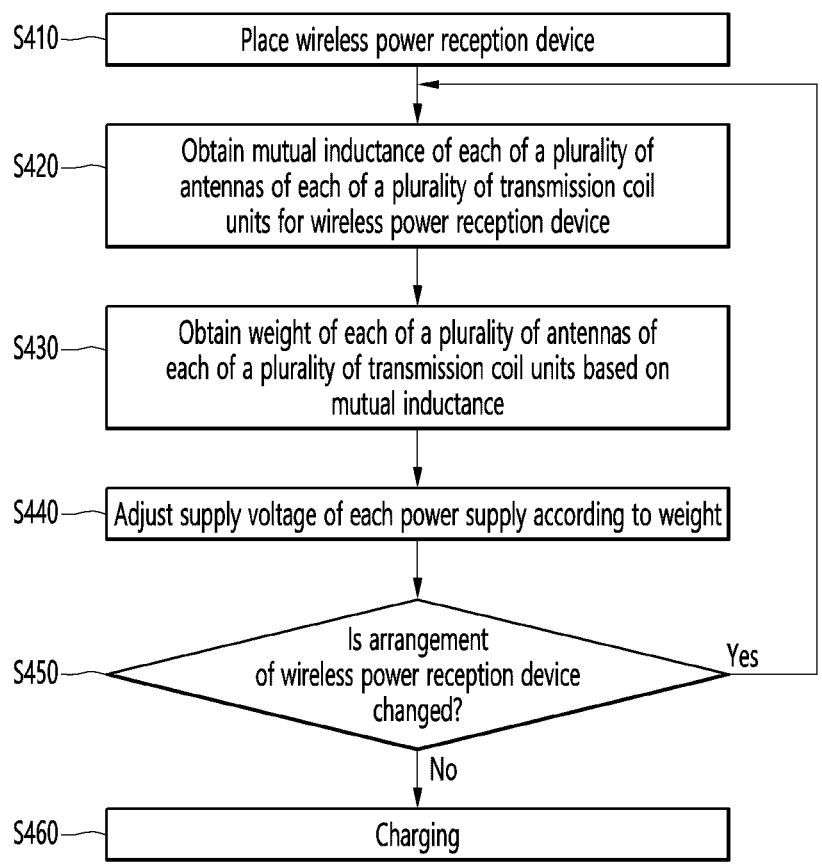
FIG. 17 is a flowchart for describing an operation method of the wireless power transmission device according to the first embodiment.

FIG. 17 is a flowchart for describing an operation method of the wireless power transmission device according to the first embodiment.

As shown in FIGS. 15 and 17, the controller 350 may obtain whether a wireless power reception device is arranged (S410).

The controller 350 may periodically transmit a request signal for detecting a wireless power reception device or a foreign object. When the wireless power reception device receives the request signal, the wireless power reception device may transmit a response signal to the wireless power transmission device.

When receiving a response signal from the wireless power reception device, the controller 350 may detect that the wireless power reception device is within a range or distance in which the wireless power transmission device is able to transmit transmission power.

Alternatively, the wireless power reception device may transmit a reception strength representing a reception level of the request signal to the wireless power transmission device as a response signal, and the wireless power transmission device may detect a position of the wireless power reception device.

When the controller 350 detects that the wireless power reception device is within a distance in which the wireless power transmission device is able to transmit transmission power, the controller 350 may prepare to transmit the transmission power.

To this end, the controller 350 may obtain a mutual inductance of each of the plurality of antennas 311 to 314 of each of the plurality of transmission coil units 310 for the wireless power reception device (S420).

As shown in FIG. 16, the mutual inductance M11 between the reception coil and the first antenna 311 may be first obtained in the first transmission coil unit 310*a*. Subsequently, the mutual inductance M12 between the reception coil and the second antenna 312 may be obtained. In this way, the mutual inductances M11 to M1*n* of the first to n-th antennas of the first transmission coil unit 310*a* for the reception coil may be sequentially obtained.

Thereafter, the mutual inductances M21 to M2*n* of the first to n-th antennas included in the second transmission coil unit 310*b* for the reception coil, the mutual inductances M31 to M3*n* of the first to n-th antennas included in the third transmission coil unit 310*c* for the reception coil and the mutual inductances M41 to M4*n* of the first to n-th antennas included in the fourth transmission coil unit 310*d* for the reception coil may be sequentially obtained.

Although it has been described above that the mutual inductances are obtained sequentially, the mutual inductances M11 to M1*n*, M21 to M2*n*, M31 to M3*n*, and M41 to M4*n* of the first to n-th antennas of the first to fourth transmission coil units 310*a* to 310*d* for the reception coil may be collectively obtained.

The controller 350 may obtain a weight for each of the plurality of antennas 311 to 314 of each of the plurality of transmission coil units 310 based on the obtained mutual inductance (S430).

First, the controller 350 may obtain a magnetic channel for each of the plurality of antennas 311 to 314 of each of the plurality of transmission coil units 310 by using Equation 1 based on the obtained mutual inductance.

The controller 350 may obtain a weight for each of the plurality of antennas 311 to 314 of each of the plurality of transmission coil units 310 by using Equation 2 based on the magnetic channel.

For example, the weight may have a magnitude and a direction as a beamforming vector corresponding to the obtained mutual inductance.

For example, weights for the plurality of antennas 311 to 314 of each of the plurality of transmission coil units 310 may be different according to the arrangement direction or position of the wireless power reception device.

For example, a large weight may mean that a mutual inductance between a reception coil and a specific antenna of a corresponding transmission coil unit is large, which may mean that power transfer efficiency between a reception coil and the specific antenna of the corresponding transmission coil unit is high.

The controller 350 may adjust the supply voltage of each of the power supplies 351 to 354 according to the weight of each of the plurality of antennas 311 to 314 of the plurality of transmission coil units 310 (S440).

As shown in FIG. 15, the power supplies 351 to 354 may be respectively connected to the plurality of antennas 311 to 314 of each of the plurality of transmission coil units 310. Accordingly, the plurality of antennas 311 to 314 of each of the plurality of transmission coil units 310 may be individually driven by the power supplies 351 to 354 connected corresponding thereto.

Each of the plurality of antennas 311 to 314 of each of the plurality of transmission coil units 310 may generate transmission power to be transmitted to the wireless power reception device by the supply voltage supplied from the power supplies 351 to 354. For example, when a current flows through an antenna by the supply voltage supplied from the power supplies 351 to 354, a magnetic field passing through the antenna may be generated in proportion to the flowing current. The strength of this magnetic field may be the magnitude of transmission power.

For example, an antenna with a large weight may increase the supply voltage of the power supply, resulting in generation of a larger magnetic field. For example, an antenna with a small weight may decrease the supply voltage of the power supply, resulting in generation of a smaller magnetic field. In this case, a larger magnetic field generated by an antenna having a larger weight may greatly contribute to generation of reception power of the wireless power reception device. A smaller magnetic field generated by an antenna having a smaller weight may contribute less to generation of reception power of the wireless power reception device.

Accordingly, the charging efficiency of the wireless power reception device may be improved by generating a larger magnetic field with an antenna having a large weight, that is, a high power transfer efficiency.

Alternatively, when the supply voltages supplied to the antennas 311 to 314 are the same regardless of weights, the same magnetic field may be generated in the antennas 311 to 314. In this case, the same magnetic field is generated in each antenna 311 to 314 regardless of weights, but the mutual inductances between the antennas 311 to 314 and the reception coil of the wireless power reception device are different, and the weights reflecting the inductances are different. Thus, the power transmission efficiencies between the antennas 311 to 314 and the reception coil of the wireless power reception device are different. Therefore, even when the same magnetic field is generated in each of the antennas 311 to 314, the magnetic field may differently contribute to the generation of reception power of the wireless power reception device. For example, a magnetic field generated by an antenna with high power transfer efficiency may contribute greatly to generation of reception power of the wireless power reception device. For example, a magnetic field generated by an antenna having low power transfer efficiency may have a small contribution to generation of reception power of a wireless power reception device.

The transmission power generated by the adjusted supply voltage in each of the plurality of antennas 311 to 314 of each of the plurality of transmission coil units 310 may be transmitted to the wireless power reception device. The reception power is received based on the transmission power, and the reception power may be charged in the wireless power reception device.

The controller 350 may obtain whether the arrangement of wireless power reception device is changed (S450).

When the wireless power reception device is freely movable, the wireless power reception device may be freely movable on the wireless power reception device. When the wireless power reception device is not fixed to the wireless power transmission device or the fixing force with the wireless power transmission device is loose, the wireless power reception device may be freely movable.

For example, when a user sits down or lies down while carrying a mobile device including a wireless power reception device in a pocket, the arrangement position or arrangement direction of the wireless power reception device may be changed.

For example, the plurality of antennas 311 to 314 or one of the plurality of antennas 311 to 314 of each of the plurality of transmission coil units 310 of the wireless power transmission device periodically transmits an acknowledge signal and the wireless power reception device may transmit a reception strength, with which the acknowledge signal is received, to the wireless power transmission device as a response signal. The wireless power transmission device may obtain the arrangement position or direction of the wireless power reception device based on the reception strength of one of the plurality of antennas 311 to 314 or the plurality of antennas 311 to 314 of each of the plurality of transmission coil units 310, which is received from the wireless power reception device.

When the arrangement of wireless power reception devices is changed, the controller 350 may perform S420 to S440.

When the arrangement of the wireless power reception device is not changed, the controller 350 may transmit the transmission power from each of the plurality of antennas 311 to 314 of the plurality of transmission coil units 310 to the wireless power reception device to charge the wireless power reception device (S460).

In an embodiment, the charging efficiency of the wireless power reception device may be improved by transmitting maximum transmission power to the wireless power reception device regardless of the arrangement position or arrangement direction of the wireless power reception device.

Figure 18:
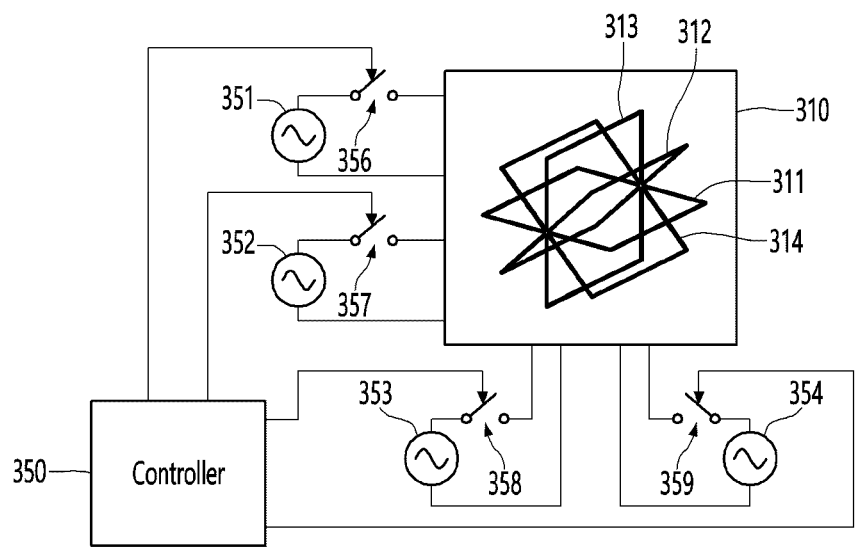
FIG. 18 shows a wireless power transmission device according to a second embodiment.

FIG. 18 shows a wireless power transmission device according to a second embodiment.

The second embodiment is the same as the first embodiment except for switches 356 to 359. In the second embodiment, the same reference numerals are given to components having the same functions as those in the first embodiment, and detailed descriptions thereof are omitted.

Referring to FIG. 18, a wireless power transmission device according to the first embodiment may include a plurality of transmission coil units 310, a plurality of power supplies 351 to 354, a plurality of switches 356 to 359 and a controller 350.

The plurality of transmission coil units 310 may be arranged as shown in FIG. 8 or 14 or arranged in various other ways.

Hereinafter, for convenience, a description will be given limitedly with respect to the transmission coil unit 310 shown in FIG. 8.

The plurality of power supplies 351 to 354 may be connected respectively to the plurality of antennas 311 to 314 of each of the plurality of transmission coil units 310.

The plurality of switches 356 to 359 may be connected between each of the plurality of power supplies 351 to 354 and each of the plurality of antennas 311 to 314 of each of the plurality of transmission coil units 310.

When the switches 356 to 359 are turned on, supply voltages of the power supplies 351 to 354 may be supplied to the corresponding antennas 311 to 314. When the switches 356 to 359 are turned off, the supply voltages of the power supplies 351 to 354 may not be supplied to the corresponding antennas 311 to 314.

The controller 350 may control the plurality of switches 356 to 359 to supply and block the supply voltage.

The controller 350 may control the plurality of switches 356 to 359 to selectively select the plurality of antennas 311 to 314 of the plurality of transmission coil units 310 under certain conditions. Here, the certain condition may be a weight with a low contribution to the generation of the reception power of the wireless power reception device among the weights for the plurality of antennas 311 to 314 of each of the plurality of transmission coil units 310, but is not limited thereto.

For example, the controller 350 may turn off a switch connected to a corresponding antenna such that an antenna for which a weight having a low contribution to the generation of the reception power of the wireless power reception device is obtained is not selected. In this case, the supply voltage of the power supply connected to the corresponding switch is not supplied to the antenna for which a weight having a low contribution to the generation of the reception power of the wireless power reception device is obtained. Thus, the transmission power cannot be transmitted from the corresponding antenna to the wireless power reception device.

For example, the controller 350 may turn on a switch connected to a corresponding antenna such that an antenna for which a weight having a high contribution to the generation of the reception power of the wireless power reception device is obtained is selected. In this case, the supply voltage of the power supply connected to the corresponding switch is supplied to the antenna for which a weight having a high contribution to the generation of the reception power of the wireless power reception device is obtained. Thus, the transmission power can be transmitted from the corresponding antenna to the wireless power reception device.

A threshold value may be set to determine whether the contribution of the wireless power reception device to the generation of reception power is low or high. In this case, when a weight is equal to or greater than a threshold value, the weight may be determined as a weight having a high contribution to the generation of reception power of the wireless power reception device. When a weight is less than the threshold value, the weight may be determined as a weight having a low contribution to the generation of reception power of the wireless power reception device.

For example, a threshold value may be set such that the number of antennas of 10% to 80% of the total number of antennas 311 to 314 included in a plurality of transmission units is determined to have a weight having a high contribution to the generation of reception power of the wireless power reception device, but is not limited thereto. When a threshold value is set such that the number of antennas less than 10% of the total number of antennas 311 to 314 included in the plurality of transmission units is determined to have a weight with a high contribution to the generation of reception power of the wireless power reception device, the number of antennas for transmitting the transmission power is small and therefore, the wireless power reception device cannot receive a desired amount of reception power, resulting in reduction in the wireless charging efficiency. When the threshold value is set such that the number of antennas greater than 80% of the total number of antennas 311 to 314 included in the plurality of transmission units 310 is determined to have a weight with a high contribution to the generation of reception power of the wireless power reception device, the number of antennas for transmitting transmission power to the wireless power reception device is large and therefore, the number of antennas for transmitting transmit power is correspondingly large, resulting in an increase in power consumption.

The controller 350 may obtain whether the arrangement of wireless power reception device is changed (S550).

When the arrangement of wireless power reception devices is changed, the controller 350 may perform S520 to S540.

When the arrangement of the wireless power reception device is not changed, the controller 350 may transmit the transmit power from each of the plurality of antennas 311 to 314 of the plurality of transmission coil units 310 to the wireless power reception device to charge the wireless power reception device (S560).

Figure 19:
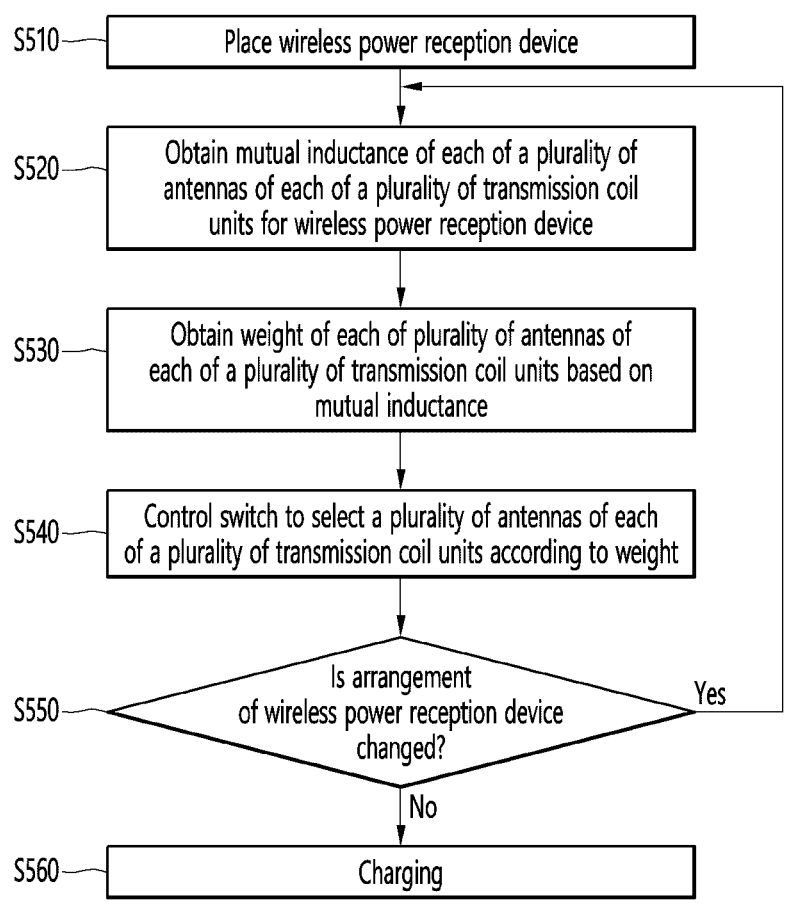
FIG. 19 is a flowchart for describing an operation method of the wireless power transmission device according to a second embodiment.

FIG. 19 is a flowchart for describing an operation method of the wireless power transmission device according to a second embodiment.

S510, S520, S530, S550, and S560 in FIG. 19 may be the same as S410, S420, S430, S450, and S460 in FIG. 17. Also, parts omitted in the following description related to FIG. 19 can be easily understood from the description related to FIG. 17.

Referring to FIGS. 18 and 19, when the controller 350 obtains whether the wireless power reception device is placed (S510), the controller 350 may obtain a mutual inductance of each of the plurality of antennas 311 to 314 of each of the plurality of transmission coil units 310 for the wireless power reception device (S520).

The controller 350 may obtain a weight for each of the plurality of antennas 311 to 314 of each of the plurality of transmission coil units 310 based on the mutual inductance of each of the plurality of antennas 311 to 314 of each of the plurality of transmission coil units 310 for the wireless power reception device (S530).

The controller 350 may control a plurality of switches 356 to 359 to selectively select each of the plurality of antennas 311 to 314 of each of the plurality of transmission coil units 310 according to the weight for each of the plurality of antennas 311 to 314 of each of the plurality of transmission coil units 310 (S540).

For example, each of the weights for the plurality of antennas 311 to 314 of each of the plurality of transmission coil units 310 may be compared with a threshold value.

As a result of the comparison, when the weight is greater than or equal to the threshold value, the controller 350 may turn on a switch connected to the corresponding antenna to select an antenna for which a weight greater than or equal to the threshold value is obtained. Accordingly, the supply voltage of the power supply connected to the corresponding switch is supplied to the corresponding antenna through the corresponding switch 356 to 359 to generate transmission power in the corresponding antenna.

As a result of the comparison, when the weight is less than the threshold value, the controller 350 may turn off a switch connected to the corresponding antenna so as not to select an antenna for which a weight less than the threshold value is obtained. Accordingly, the supply voltage of the power supply connected to the corresponding switch is not supplied to the corresponding antenna through the corresponding switch, so that transmission power is not generated from the corresponding antenna.

Therefore, among the plurality of antennas 311 to 314 of each of the plurality of transmission coil units 310, transmission power may be selectively transmitted to the wireless power reception device through antennas for weights greater than or equal to the threshold value are obtained.

In the case of an antenna for which a weight less than the threshold value is obtained, since the contribution of the transmission power to the generation of the reception power of the wireless power reception device is low even when the transmission power is transmitted to the wireless power reception device through the antenna, power consumption of the wireless power transmission device may be reduced by blocking transmission power from being transmitted to the wireless power reception device.

Figure 20:
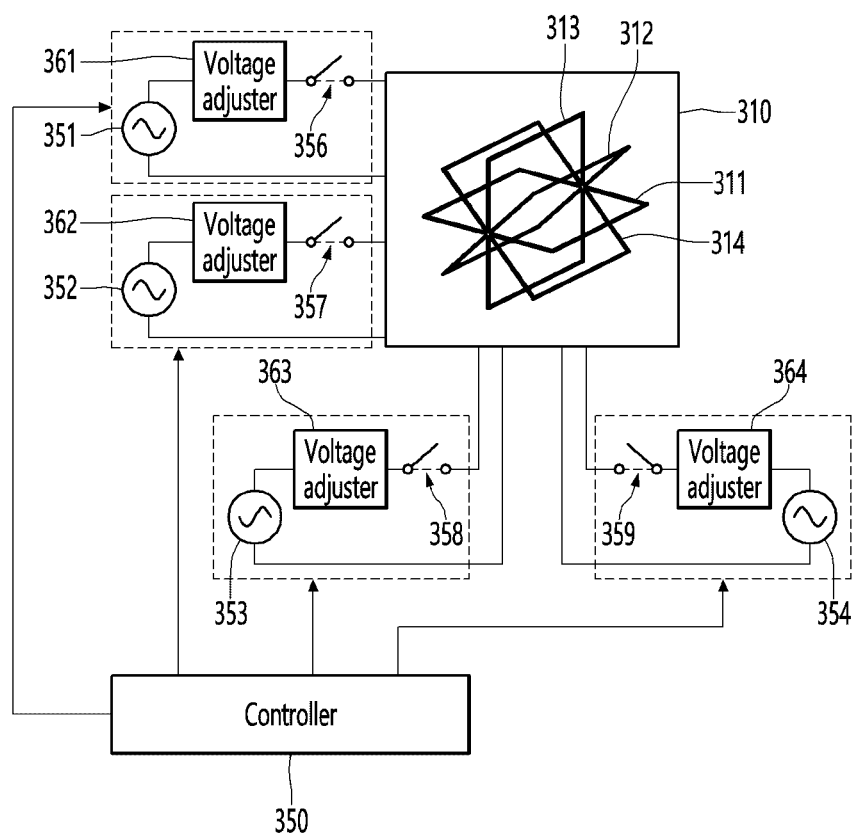
FIG. 20 shows a wireless power transmission device according to a third embodiment.

FIG. 20 shows a wireless power transmission device according to a third embodiment.

The third embodiment is the same as the second embodiment except for voltage adjusters 361 to 364. In the third embodiment, the same reference numerals are given to components having the same functions as those in the second embodiment, and detailed descriptions thereof are omitted.

Referring to FIG. 20, a wireless power transmission device according to the first embodiment may include a plurality of transmission coil units 310, a plurality of power supplies 351 to 354, a plurality of switches 356 to 359, a plurality of voltage adjusters 361 to 364, and a controller 350.

The plurality of transmission coil units 310 may be arranged as shown in FIG. 8 or 14 or arranged in various other ways.

Hereinafter, for convenience, a description will be given limitedly with respect to the transmission coil unit 310 shown in FIG. 8.

The plurality of power supplies 351 to 354 may be connected respectively to the plurality of antennas 311 to 314 of each of the plurality of transmission coil units 310.

The plurality of switches 356 to 359 may be connected respectively to the plurality of power supplies 351 to 354 and the plurality of antennas 311 to 314 of each of the plurality of transmission coil units 310.

The plurality of voltage adjusters 361 to 364 may be connected between each of the plurality of power supplies 351 to 354 and each of the plurality of switches 356 to 359. Although not shown, the plurality of voltage adjusters 361 to 364 may be respectively connected between the plurality of switches 356 to 359 and the plurality of antennas 311 to 314 of each of the plurality of transmission coil units.

The controller 350 may control the plurality of switches 356 to 359 and the plurality of voltage adjusters 361 to 364.

The controller 350 may first control the plurality of switches 356 to 359 and then control the plurality of voltage adjusters 361 to 364.

For example, the controller 350 may control the plurality of switches 356 to 359 so as to selectively select the plurality of antennas 311 to 314 of each of the plurality of transmission coil units 310 based on the weights for the plurality of antennas 311 to 314 of each of the plurality of transmission coil units for the wireless power reception device and then control the voltage adjusters 361 to 364 so as to adjust the supply voltage supplied to the selectively selected antenna based on the number of selectively selected antennas and the weights for the plurality of antennas 311 to 314 of each of the plurality of transmission coil units 310 for the wireless power reception device. Here, the voltage adjusters 361 to 364 under the control of the controller 350 may be voltage adjusters 361 to 364 connected to the switches 356 to 359 that are turned on.

For example, when the number of the plurality of transmission coil units 310 is 10 and the number of the plurality of antennas 311 to 314 of each of the transmission coil unit 310 is 10, a total of 100 antennas may be provided.

In this case, 50 switches 356 to 359 respectively connected to 50 antennas may be turned on to select the 50 antennas based on the weights for the plurality of antennas 311 to 314 of each of the plurality of transmission coil units 310 for the wireless power reception device. Thereafter, supply voltages of the voltage adjusters 361 to 364 respectively connected to 50 switches 356 to 359 may be individually adjusted based on information indicating that there are 50 antennas turned on and the weights for the plurality of antennas 311 to 314 of each of the plurality of transmission coil units 310 for the wireless power reception device.

The controller 350 may obtain whether the arrangement of wireless power reception device is changed (S660).

When the arrangement of wireless power reception devices is changed, the controller 350 may perform S620 to S650.

When the arrangement of the wireless power reception device is not changed, the controller 350 may transmit the transmit power from each of the plurality of antennas 311 to 314 of the plurality of transmission coil units 310 to the wireless power reception device to charge the wireless power reception device (S670).

Figure 21:
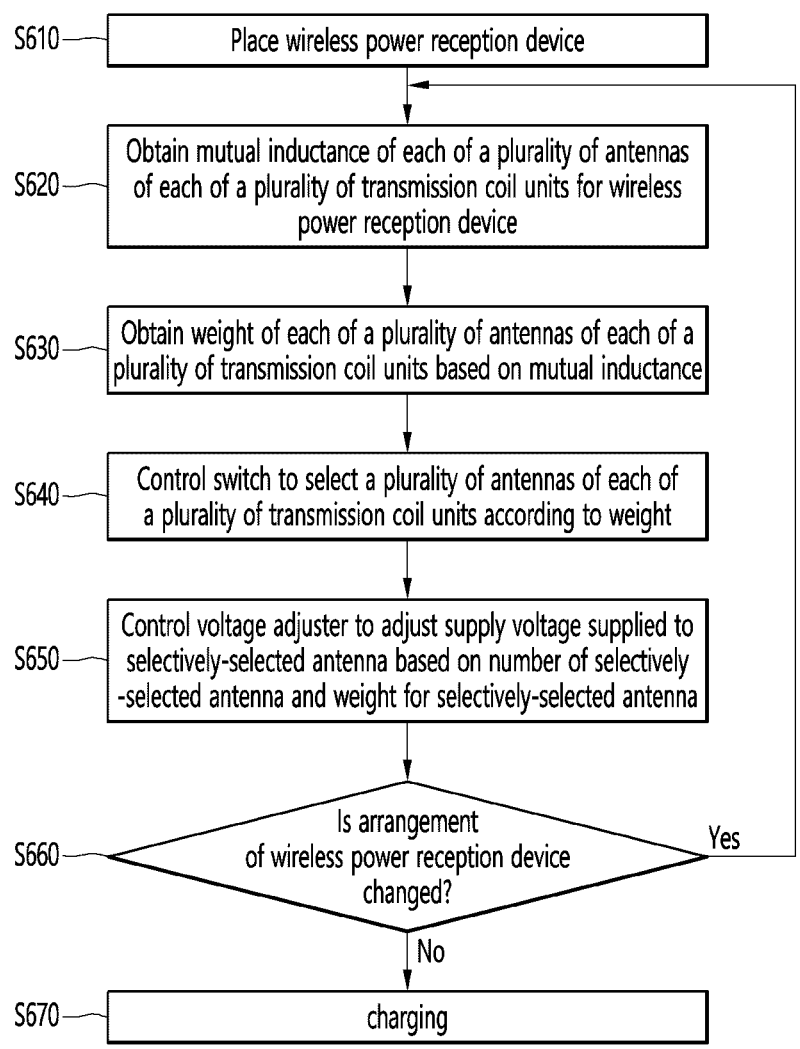
FIG. 21 is a flowchart for describing an operation method of the wireless power transmission device according to a third embodiment.

FIG. 21 is a flowchart for describing an operation method of the wireless power transmission device according to a third embodiment.

S610, S620, S630, S640, S660, and S670 in FIG. 21 may be the same as S510, S520, S530, S540, S550, and S560 in FIG. 19. Also, parts omitted in the following description related to FIG. 21 can be easily understood from the description related to FIG. 19.

Referring to FIGS. 20 and 21, when the controller 350 obtains whether the wireless power reception device is placed (S610), the controller 350 may obtain a mutual inductance of each of the plurality of antennas 311 to 314 of each of the plurality of transmission coil units 310 for the wireless power reception device (S620).

The controller 350 may obtain a weight for each of the plurality of antennas 311 to 314 of each of the plurality of transmission coil units 310 based on the mutual inductance of each of the plurality of antennas 311 to 314 of each of the plurality of transmission coil units 310 for the wireless power reception device (S630).

The controller 350 may control a plurality of switches 356 to 359 to selectively select each of the plurality of antennas 311 to 314 of each of the plurality of transmission coil units 310 according to the weight for each of the plurality of antennas 311 to 314 of each of the plurality of transmission coil units 310 (S640).

The controller 350 may control the voltage adjusters 361 to 364 to adjust a supply voltage supplied to an antenna selectively selected based on the number of the selectively selected antennas and the weight of each of the selectively selected antennas (S650).

For example, when 50 antennas are selectively selected from among 100 antennas 311 to 314, the controller 350 may control the voltage adjusters 361 to 364 respectively connected to the 50 antennas to adjust the supply voltage supplied to the 50 antennas.

The supply voltages of the power supplies 351 to 354 are input to the voltage adjusters 361 to 364, and the voltage adjusters 361 to 364 may adjust the corresponding supply voltage under the control of the controller 350.

For example, the voltage adjusters 361 to 364 may be adjusted such that the supply voltage increases as the weight is larger, but is not limited thereto.

Figure 22:
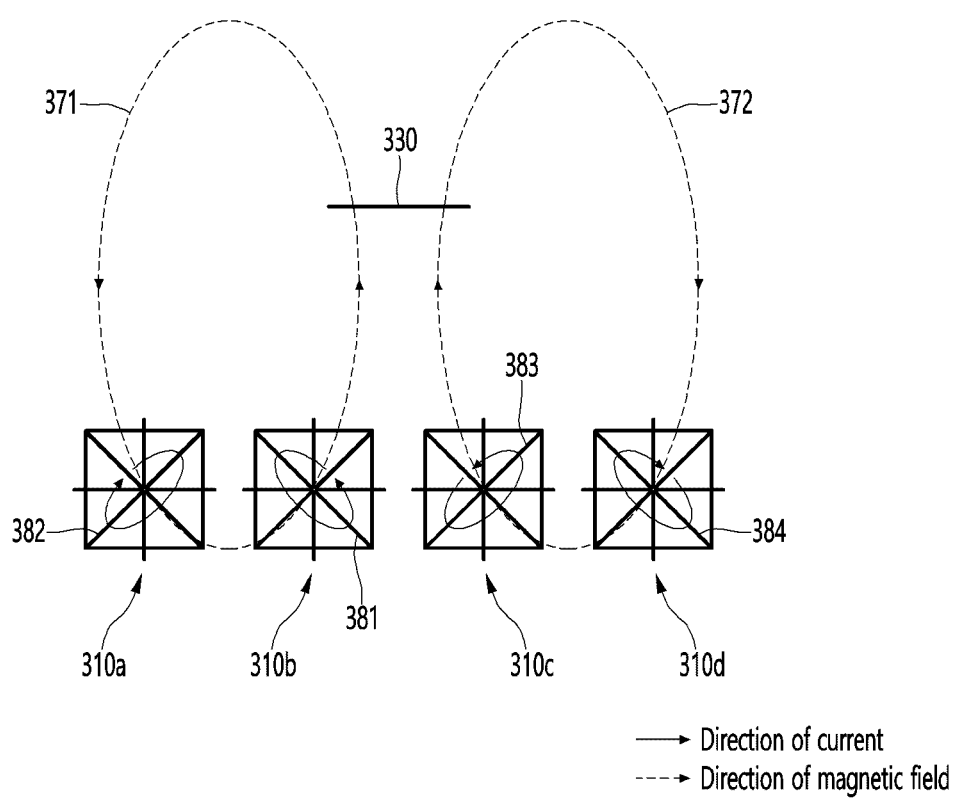
FIG. 22 shows a state in which two magnetic field loops are formed using four transmission coil units when the reception coils of a wireless power reception device are disposed on a plurality of transmission coils such that the planes of the reception coils face each other.

FIG. 22 shows a state in which two magnetic field loops are formed using four transmission coil units when the reception coils of a wireless power reception device are disposed on a plurality of transmission coils such that the planes of the reception coils face each other.

As shown in FIG. 22, when the reception coils of the wireless power reception device are disposed parallel to or opposite to the same plane on which the plurality of transmission coil units 310a to 310d are disposed, a first magnetic field loop 371 and a second magnetic field loop 372 having opposite directions may be formed using a plurality of antennas of each of some transmission coil units among the plurality of transmission coil units 310a to 310d. For example, the first magnetic field loop 371 may be generated using antennas of at least two transmission coil units.

For example, the second magnetic field loop 372 may be generated using antennas of at least two transmission coil units. In this way, a phenomenon in which amplification is caused by magnetic fields generated by the antennas of two or more transmission coil units is referred to as magnetic beamforming.

For example, a magnetic field may be generated in a counterclockwise direction in the first magnetic field loop 371, and a magnetic field may be generated in a clockwise direction in the second magnetic field loop 372.

Therefore, since the magnetic field by the first magnetic field loop 371 and the magnetic field by the second magnetic field loop 372 are subjected to flux linkage with the reception coil of the wireless power reception device, the reception power of the wireless power reception device may be further increased, thus improving charging efficiency of the power receiver.

The first magnetic field loop 371 and the second magnetic field loop 372 may be formed by the following antenna operation.

For example, when a current flows in a clockwise direction through a specific antenna 382 among a plurality of antennas of the first transmission coil unit 310a, a first magnetic field passing through the specific antenna 382 from the upper side of the specific antenna 382 to the lower side of the specific antenna 382 may be generated. The specific antenna 382 may be an antenna disposed rotated 45 degrees with respect to a horizontal plane. For example, when a current flows in a counterclockwise direction through a specific antenna 381 among a plurality of antennas of the second transmission coil unit 310b, a second magnetic field passing through the specific antenna 381 from the lower side of the specific antenna 381 to the upper side of the specific antenna 381 may be generated. The specific antenna 381 may be an antenna rotated by 135 degrees with respect to a horizontal plane. Accordingly, a first magnetic field loop 371 of magnetic field beamforming passing through the reception coil of the wireless power reception device may be formed by the first magnetic field and the second magnetic field.

For example, when a current flows in a counterclockwise direction through a specific antenna 383 among a plurality of antennas of the third transmission coil unit 310c, a third magnetic field passing through the specific antenna 383 from the lower side of the specific antenna 383 to the upper side of the specific antenna 383 may be generated. The specific antenna 383 may be an antenna disposed rotated 45 degrees with respect to a horizontal plane. When a current flows in a clockwise direction through a specific antenna 384 among a plurality of antennas of the fourth transmission coil unit 310d, a fourth magnetic field passing through the specific antenna 384 from the upper side of the specific antenna 384 to the lower side of the specific antenna 384 may be generated. The specific antenna 384 may be an antenna disposed rotated 135 degrees with respect to a horizontal plane. Accordingly, a second magnetic field loop 372 of magnetic field beamforming passing through the reception coil of the wireless power reception device may be formed by the third magnetic field and the fourth magnetic field.

Although it is illustrated in FIG. 22 that the first magnetic field loop 371 or the second magnetic field loop 372 is formed by the transmission coil units 310a to 310d adjacent to each other, the first magnetic field loop 371 or a second magnetic field loop 372 may be formed by two or more transmission coil units that are not adjacent to each other.

Figure 23:
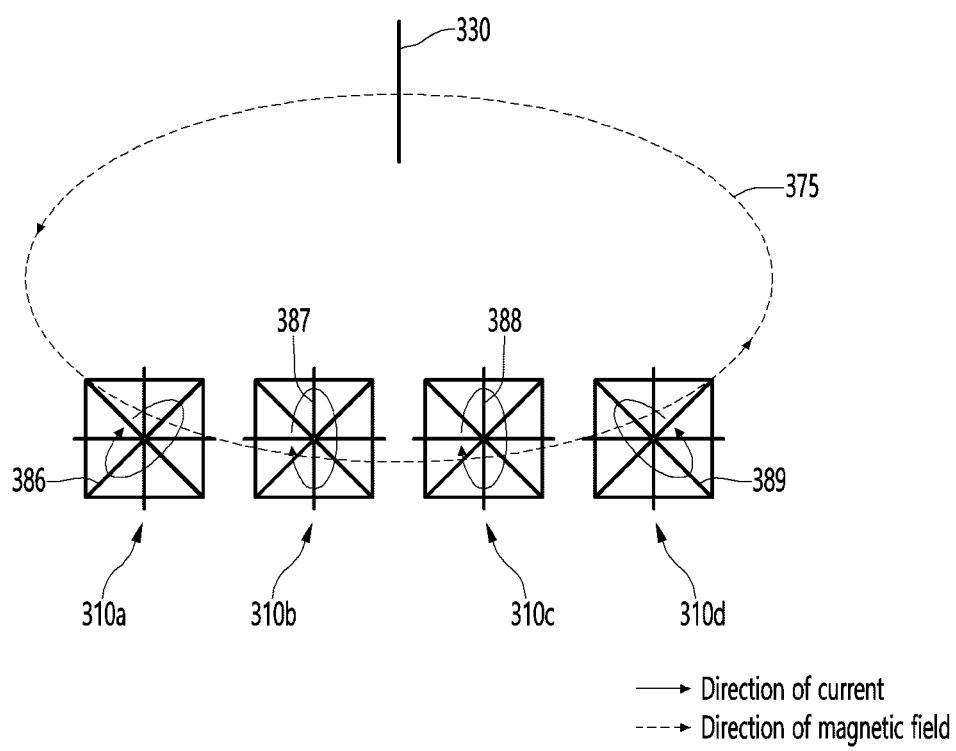
FIG. 23 shows a state in which one magnetic field loop is formed using four transmission coil units when the reception coils of a wireless power reception device are disposed on a plurality of transmission coils such that the planes of the reception coils are perpendicular to each other.

FIG. 23 shows a state in which one magnetic field loop is formed using four transmission coil units when the reception coils of a wireless power reception device are disposed on a plurality of transmission coils such that the planes of the reception coils are perpendicular to each other.

As shown in FIG. 23, when the reception coils of the wireless power reception device are disposed perpendicular to the same plane on which the plurality of transmission coil units 310a to 310d are disposed, a magnetic field loop 375 passing through the reception coil of the wireless power reception device in one direction may be formed using a plurality of antennas of each of some transmission coil units among the plurality of transmission coil units 310a to 310d.

For example, the magnetic field loop 375 may be generated using antennas of at least four transmission coil units 310a to 310d. In this way, a phenomenon in which amplification is caused by magnetic fields generated by the antennas of the four or more transmission coil units 310a to 310d is referred to as magnetic beamforming.

For example, the magnetic field loop 375 may pass through the reception coil of the wireless power reception device in a clockwise or counterclockwise direction.

The magnetic field loop 375 may be formed by the following antenna operation.

When a current flows in a clockwise direction through a specific antenna 386 of the first transmission coil unit 310a, a first magnetic field passing through the specific antenna 386 from the upper side of the specific antenna 386 to the lower side of the specific antenna 386 may be generated. The specific antenna 386 may be an antenna disposed rotated 45 degrees with respect to a horizontal plane. When a current flows in a clockwise direction through a specific antenna 387 of the second transmission coil unit 310b, a second magnetic field passing through the specific antenna 387 from the left side to the right side of the specific antenna 387 may be generated. The specific antenna 387 may be an antenna rotated by 90 degrees with respect to a horizontal plane. When a current flows in a clockwise direction through the specific antenna 388 of the third transmission coil unit 310c, a third magnetic field passing through the specific antenna 388 from the left side to the right side may be generated. The specific antenna 388 may be an antenna rotated by 90 degrees with respect to a horizontal plane. When a current flows in a counterclockwise direction through a specific antenna 389 of the fourth transmission coil unit 310d, a fourth magnetic field passing through the specific antenna 389 from the lower side of the specific antenna 389 to the upper side of the specific antenna 389 may be generated. The specific antenna 389 may be an antenna rotated 135 degrees with respect to the horizontal plane. Accordingly, a magnetic field loop 375 of magnetic field beamforming passing through the reception coil of the wireless power reception device may be formed by the first to fourth magnetic fields.

The first and second magnetic field loops 371 and 372 shown in FIG. 22 or the magnetic field loop 375 shown in FIG. 23 may be a magnetic field amplified by a beamforming method.

Figure 24:
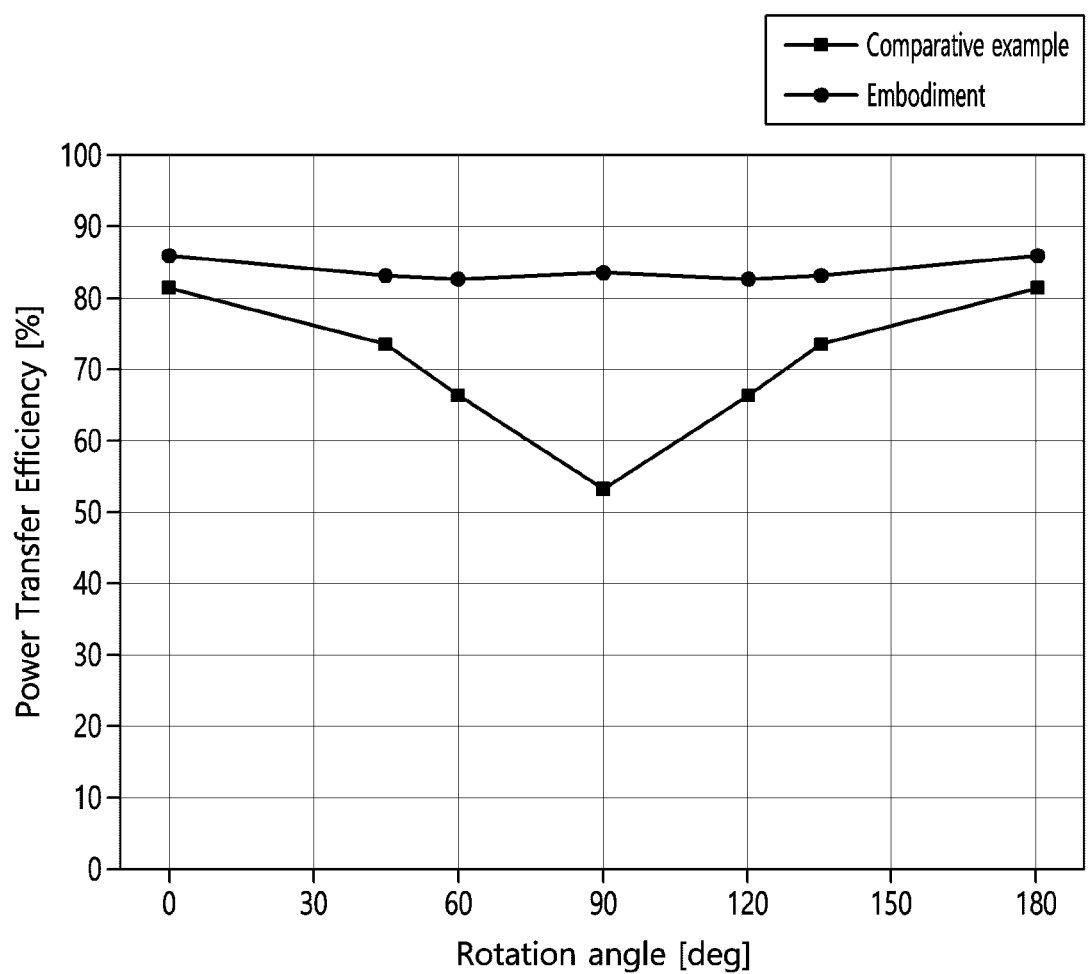
FIG. 24 shows power transfer efficiency in a comparative example and the embodiment.

FIG. 24 shows power transfer efficiency in a comparative example and the embodiment.

In FIG. 24, the horizontal axis represents a rotation angle, and the vertical axis represents power transfer efficiency. The rotation angle refers to a rotation angle of a reception coil of a wireless power reception device. When the reception coil of the wireless power reception device is disposed parallel to a horizontal plane, 0 degree may be defined. FIG. 24 shows power transfer efficiency when the reception coil of the wireless power reception device is rotated from 0 degrees to 180 degrees with respect to the horizontal plane.

In FIG. 24, the comparative example is a transmission coil unit including a single antenna having a planar structure, and the embodiment is a transmission coil unit (310 in FIGS. 8 and 341 to 343 in FIG. 14) including a plurality of antennas having multi-dimensional planes.

It can be seen in FIG. 24 that in the comparative example, the power transfer efficiency is the maximum when the reception coil of the wireless power reception device is 0 degrees or 180 degrees to respect to the horizontal plane, and the power transfer efficiency is the minimum when the reception coil of the wireless power reception device is rotated 90 degrees with respect to the horizontal plane.

Also, it can be seen that, in the embodiment, almost uniform power transfer efficiency is achieved when the reception coil of the wireless power reception device is disposed in a range of between 0 degrees and 180 degrees with respect to the horizontal plane. In other words, it can be seen that, in the embodiment, the power transfer efficiency is not reduced even when the reception coil of the wireless power reception device is at 90 degrees with respect to the horizontal plane.

Although the reception coil of the wireless power reception device is rotated with respect to the horizontal plane, the plurality of antennas may have different contributions to the generation of reception power of the wireless power reception device. As described above, the contributions of the plurality of antennas to the generation of the reception power of the wireless power reception device are different, but the average value of the contributions is almost the same even when the reception coil of the wireless power reception device is rotated and thus the power transfer efficiency is also almost uniform.

Hereinafter, mutual inductance according to the movement of the transmission coil unit of the wireless power transmission device caused by the arrangement direction of the reception coil of the wireless power reception device will be described.

Figure 25A:
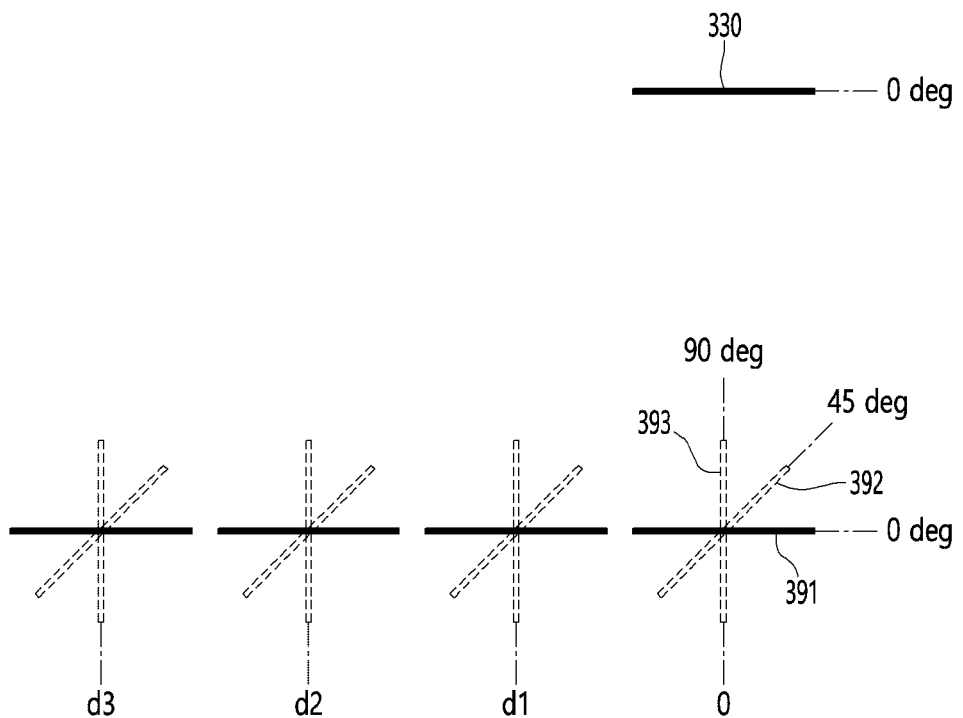
FIGS. 25a and 25b show mutual inductances of first to third antennas of the transmission coil unit of the wireless power transmission device with respect to the wireless power reception device when the wireless power reception device is disposed at 0 degrees.
Figure 25B:
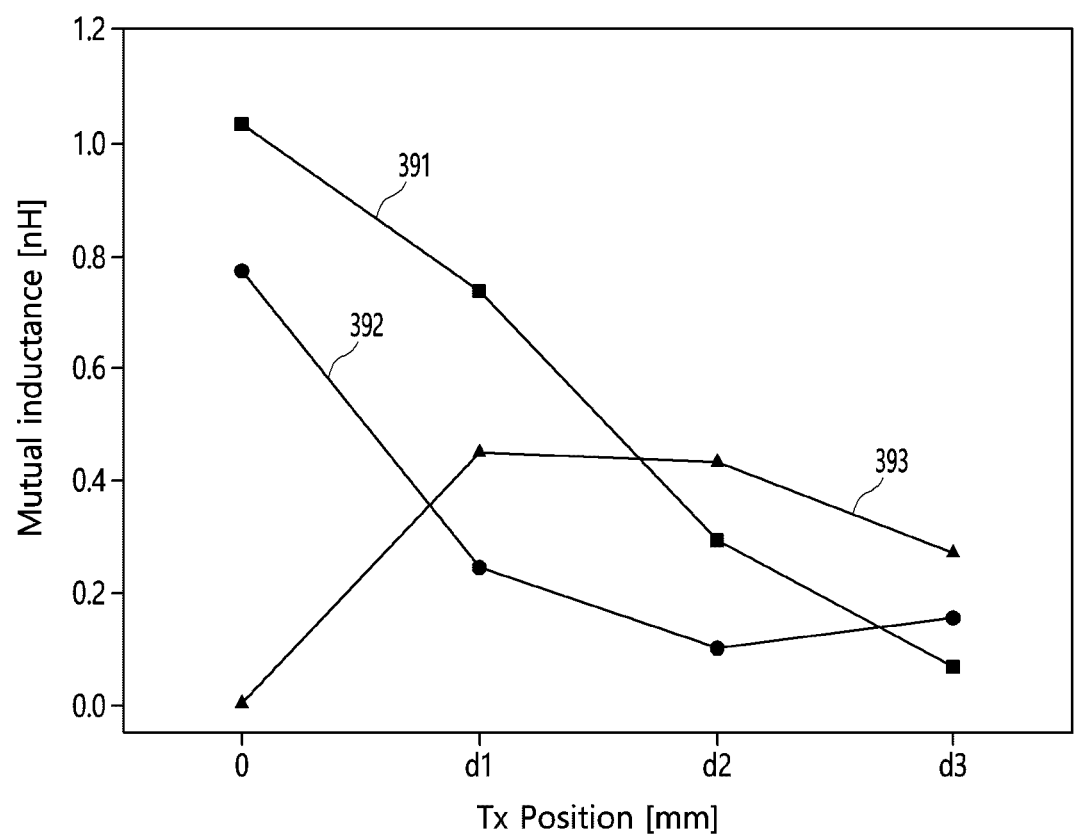
Figure 26A:
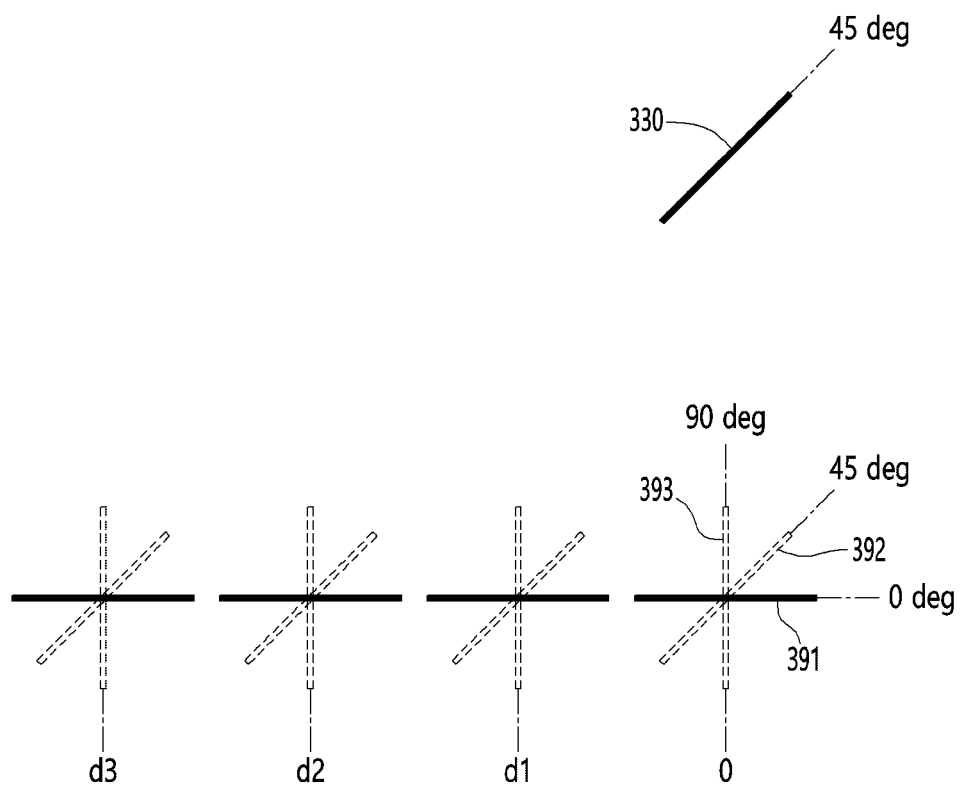
FIGS. 26a and 26b show mutual inductances of first to third antennas of the transmission coil unit of the wireless power transmission device with respect to the wireless power reception device when the wireless power reception device is disposed at 45 degrees.
Figure 26B:
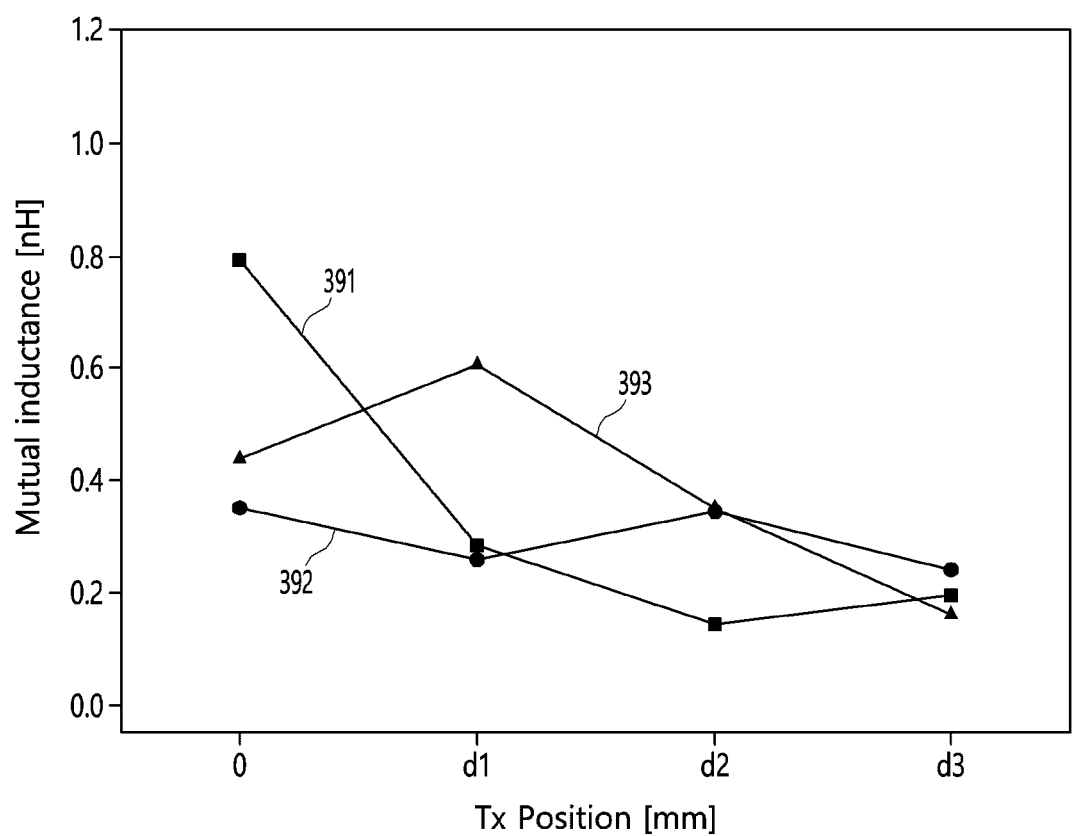
Figure 27A:
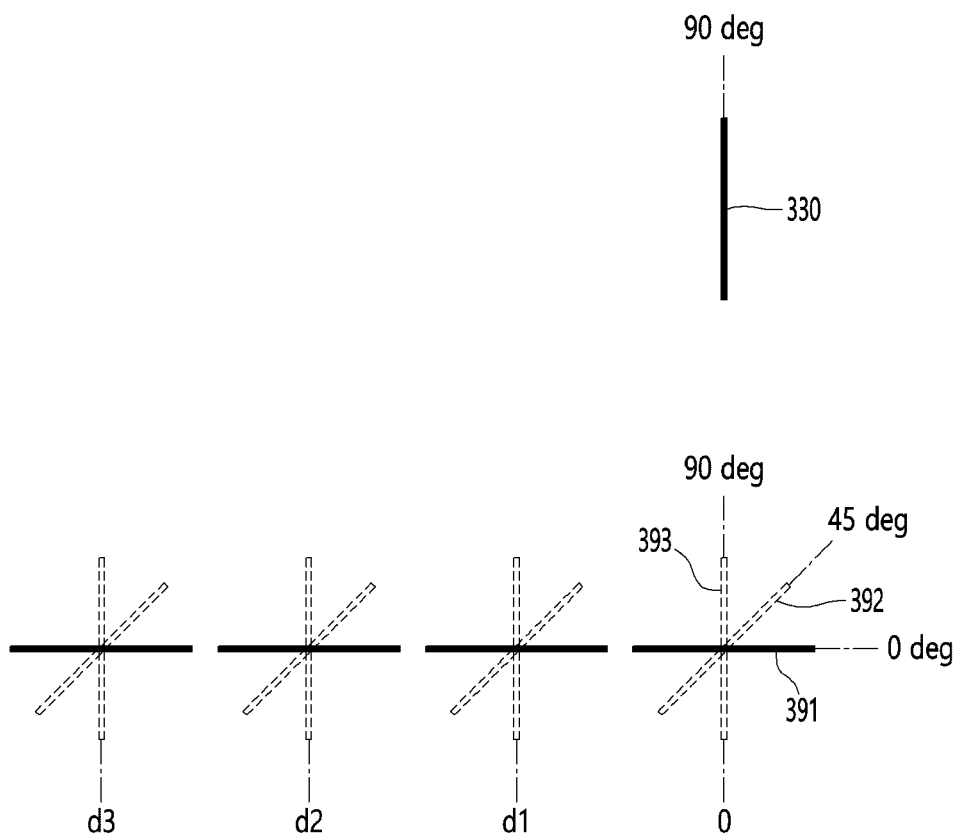
FIGS. 27a and 27b show mutual inductances of first to third antennas of the transmission coil unit of the wireless power transmission device with respect to the wireless power reception device when the wireless power reception device is disposed at 90 degrees.
Figure 27B:
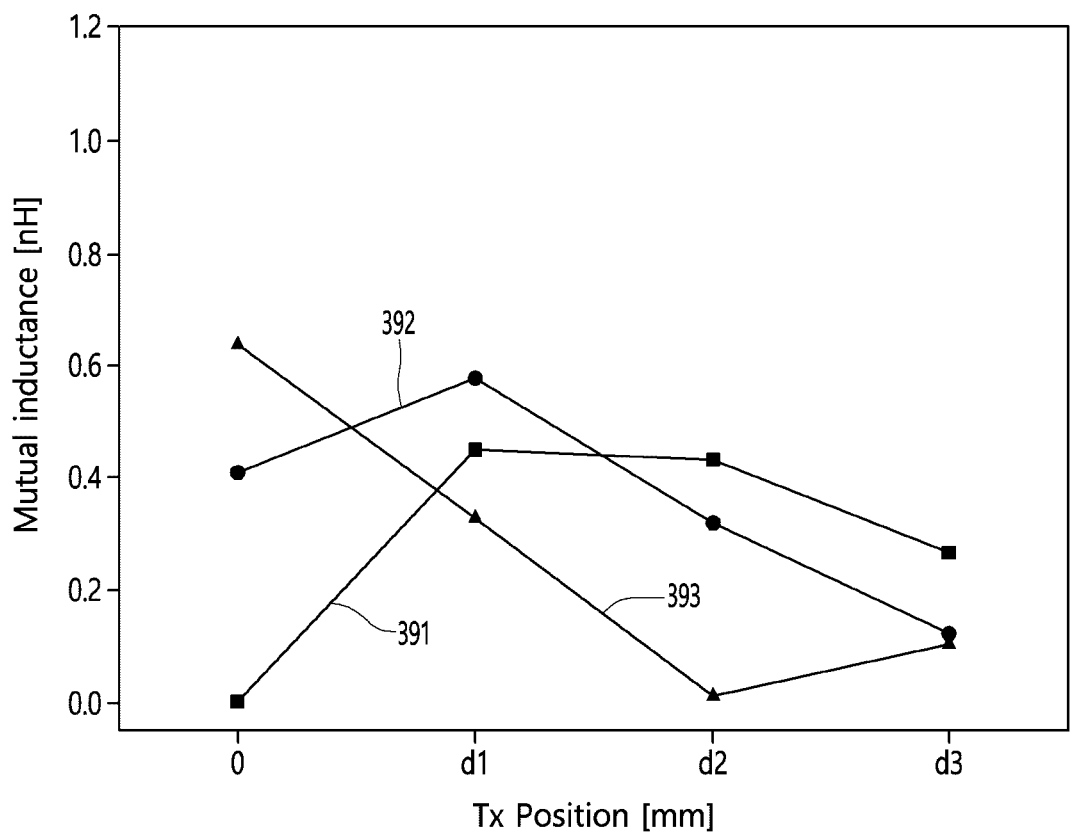

FIGS. 25a and 25b show mutual inductances of first to third antennas of the transmission coil unit of the wireless power transmission device with respect to the wireless power reception device when the wireless power reception device is disposed at 0 degrees. FIGS. 26a and 26b show mutual inductances of first to third antennas of the transmission coil unit of the wireless power transmission device with respect to the wireless power reception device when the wireless power reception device is disposed at 45 degrees. FIGS. 27a and 27b show mutual inductances of first to third antennas of the transmission coil unit of the wireless power transmission device with respect to the wireless power reception device when the wireless power reception device is disposed at 90 degrees.

In FIGS. 25a to 27b, d1, d2, and d3 are distances moved to the left from the reference point (0) of the transmission coil unit. d2 is greater than d1, and d3 is greater than d2.

The transmission coil unit may include first to third antennas. The first antenna 391 may be parallel to the horizontal plane, the second antenna 392 may be rotated 45 degrees with respect to the horizontal plane, and the third antenna 393 may be rotated 90 degrees with respect to the horizontal plane.

For example, when the reception coil of the wireless power reception device is disposed at 0 degrees or 45 degrees (FIG. 25b and FIG. 26b), the first antenna of the transmission coil unit has a decrease in the mutual inductance as the transmission coil unit is moved from the reference point (0) by the first to third distances d1 to d3. On the other hand, when the reception coil of the wireless power reception device is disposed at 90 degrees (FIG. 27b), the first antenna of the transmission coil unit may have the maximum mutual inductance at the first distance d1 and the second distance d2, and the minimum mutual inductance at the reference point (0).

For example, when the reception coil of the wireless power reception device is disposed at 0 degrees or 90 degrees (FIG. 25b and FIG. 27b), the second antenna of the transmission coil unit has a decrease in the mutual inductance as the transmission coil unit is moved from the reference point (0) by the first to third distances d1 to d3. On the other hand, it can be seen that, when the reception coil of the wireless power reception device is disposed at 45 degrees (FIG. 26b), the second antenna of the transmission coil unit has nearly no change in the mutual inductance as the transmission coil unit is moved from the reference point (0) by the first to third distances d1 to d3.

For example, when the reception coil of the wireless power reception device is disposed at 0 degrees (FIG. 25b), the third antenna of the transmission coil unit may have the maximum mutual inductance at the first distance d1 and the second distance d2, and the minimum mutual inductance at the reference point (0). On the other hand, when the reception coil of the wireless power reception device is disposed at 45 degrees or 90 degrees (FIG. 26b and FIG. 27b), the third antenna of the transmission coil unit may have a decrease in the mutual inductance as the transmission coil unit is moved from the reference point (0) by the first to third distances d1 to d3.

It can be seen from FIGS. 25a to 27b that mutual inductance with each antenna of the transmission coil of the wireless power transmission device changes as the arrangement direction of the reception device of the wireless power reception device is changed. The embodiment includes a plurality of transmission coil units each including a plurality of antennas having three-dimensional planes of a stereostructure, securing constant power transfer efficiency even when the wireless power reception device is changed in various positions or directions.

The above detailed description should not be construed as limiting in all respects and should be considered illustrative. The scope of the embodiments should be determined by reasonable interpretation of the appended claims, and all changes within the equivalent range of the embodiments are included in the scope of the embodiments.

INDUSTRIAL APPLICABILITY

The embodiment may be variously applied to overall industries such as IT, vehicle, railway, and home appliance industries as well as mobile.

The invention claimed is:

1. A wireless power transmission device comprising:
a plurality of transmission coil units,
wherein each of the plurality of transmission coil units includes a plurality of antenna coils arranged on different three-dimensional planes;
a plurality of power supplies respectively connected to the plurality of antenna coils within each transmission coil unit; and
a controller connected to the plurality of power supplies within a same transmission coil unit,
wherein the plurality of antenna coils are configured to generate a magnetic field passing through at least one or more of the different three-dimensional planes to transfer transmission power to a wireless power reception device,
wherein the controller is configured to:
obtain a mutual inductance of each of the plurality of antenna coils within the same transmission coil unit for the wireless power reception device when the wireless power reception device is disposed on the wireless power transmission device;
obtain a weight for each of the plurality of antenna coils within the same transmission coil unit based on the corresponding mutual inductance; and
adjust a supply voltage of one or more of the plurality of power supplies based on the corresponding weight, and
wherein the weight is a beamforming vector corresponding to the mutual inductance, the beamforming vector having a magnitude and a direction.

2. The wireless power transmission device of claim 1, wherein each of the plurality of antenna coils within each of the plurality of transmission coil units is disposed on a three-dimensional plane having an angle in a range of 0 degrees to 359 degrees with respect to a specific axis.

3. The wireless power transmission device of claim 2, wherein the specific axes of at least two of the plurality of transmission coil units have different directions.

4. The wireless power transmission device of claim 1, wherein the plurality of antenna coils in each of the plurality of transmitting coil units include:
a first set of antenna coils disposed on a three-dimensional plane having an angle in a range of 0 degrees to 359 degrees with respect to a first specific axis, and
a second set of antenna coils disposed on a three-dimensional plane having an angle in a range of 0 degrees to 359 degrees with respect to a second specific axis, and
wherein the first specific axis of the first set of antenna coils is different than the second specific axis of the second set of antenna coils.

5. The wireless power transmission device of claim 1, wherein the plurality of antenna coils are formed of coils independent of each other.

6. The wireless power transmission device of claim 1, wherein weights of at least two antenna coils within the same transmission coil unit are set to be different based on an arrangement direction of the wireless power reception device.

7. The wireless power transmission device of claim 1, wherein weights of at least two antenna coils within the same transmission coil unit are set to be different based on an arrangement position of the wireless power reception device.

8. The wireless power transmission device of claim 1, wherein the controller is configured to increase the supply voltage of the one or more of the plurality of power supplies based on the weight.

9. The wireless power transmission device of claim 1, further comprising:
a plurality of switches respectively connected between the plurality of antenna coils and the plurality of power supplies.

10. The wireless power transmission device of claim 9, wherein the controller is configured to:
control at least one of the plurality of switches to selectively select at least one of the plurality of antenna coils based on the corresponding weight, and provide a supply voltage to the at least one of the plurality of antenna coils via the at least one of the plurality of switches.

11. The wireless power transmission device of claim 9, further comprising:
a plurality of voltage adjusters respectively connected between the plurality of antenna coils and the plurality of power supplies.

12. The wireless power transmission device of claim 11, wherein the controller is configured to:
control at least one of the plurality of switches to selectively select at least one of the plurality of antenna coils based on the corresponding weight, and provide a supply voltage to the at least one of the plurality of antenna coils via the at least one of the plurality of switches; and
control at least one of the plurality of voltage adjusters to adjust the supply voltage supplied to the at least one of the plurality of antenna coils based on a number of selected antenna coils among the plurality of antenna coils within the same transmission unit and a corresponding weight for the at least one of the plurality of antenna coils.

13. The wireless power transmission device of claim 1, wherein the plurality of transmission coil units are disposed on a same plane.

14. The wireless power transmission device of claim 13, wherein, when a plane of a reception coil of the wireless power reception device is disposed to face the same plane of the plurality of transmission coil units,
a first magnetic field loop passing through the reception coil of the wireless power reception device in a counterclockwise direction is formed by one of the plurality of antenna coils in some transmission coil units among the plurality of transmission coil units, and a second magnetic field loop passing through the reception coil of the wireless power reception device in a clockwise direction is formed by one of the plurality of antenna coils in other transmission coil units among the plurality of transmission coil units.

15. The wireless power transmission device of claim 13, wherein, when a plane of a reception coil of the wireless power reception device is disposed perpendicular to the same plane of the plurality of transmission coil units, a magnetic field loop passing through the reception coil of the wireless power reception device in one direction is formed by one of the plurality of antenna coils in each of at least four transmission coil units among the plurality of transmission coil units.

16. A wireless power transmission device comprising:
a plurality of antenna coils, each of the plurality of antenna coils being arranged on a different three-dimensional plane;
a plurality of power supplies respectively connected to the plurality of antenna coils within each transmission coil unit; and
a controller connected to the plurality of power supplies within a same transmission coil unit,
wherein the plurality of antenna coils are configured to generate magnetic fields in different directions to transfer transmission power to a wireless power reception device,
wherein the controller is configured to:
obtain a mutual inductance of each of the plurality of antenna coils within the same transmission coil unit for the wireless power reception device when the wireless power reception device is disposed on the wireless power transmission device;
obtain a weight for each of the plurality of antenna coils within the same transmission coil unit based on the corresponding mutual inductance; and
adjust a supply voltage of one or more of the plurality of power supplies based on the corresponding weight, and
wherein the weight is a beamforming vector corresponding to the mutual inductance, the beamforming vector having a magnitude and a direction.

* * * * *